US011387771B2

(12) United States Patent
Au et al.

(10) Patent No.: US 11,387,771 B2
(45) Date of Patent: Jul. 12, 2022

(54) HELICAL ACTUATOR SYSTEM FOR SOLAR TRACKER

(71) Applicant: NEXTracker Inc., Fremont, CA (US)

(72) Inventors: Alexander W. Au, Oakland, CA (US);
Andrew T. Smith, Oakland, CA (US);
Poi K. Tran, Oakland, CA (US)

(73) Assignee: NEXTracker LLC, Fremont, CA (US)

( * ) Notice: Subject to any disclaimer, the term of this patent is extended or adjusted under 35 U.S.C. 154(b) by 569 days.

(21) Appl. No.: 16/002,273

(22) Filed: Jun. 7, 2018

(65) Prior Publication Data
US 2019/0379323 A1 Dec. 12, 2019

(51) Int. Cl.
H01L 31/042 (2014.01)
H02S 20/32 (2014.01)
F24S 30/425 (2018.01)
F16H 19/04 (2006.01)
F16H 19/00 (2006.01)
(Continued)

(52) U.S. Cl.
CPC ........... H02S 20/32 (2014.12); F16H 19/001 (2013.01); F16H 19/025 (2013.01); F16H 19/04 (2013.01); F24S 30/425 (2018.05); F24S 2030/11 (2018.05); F24S 2030/115 (2018.05); F24S 2030/134 (2018.05); F24S 2030/15 (2018.05)

(58) Field of Classification Search
None
See application file for complete search history.

(56) References Cited

U.S. PATENT DOCUMENTS 3,055,230 A * 9/1962 Strassberg .......... F16H 25/2247
74/424.82
4,063,543 A 12/1977 Hedger
(Continued)

FOREIGN PATENT DOCUMENTS

CN 203423651 U 2/2014
CN 104966748 A 10/2015
(Continued)

OTHER PUBLICATIONS

PCT Search Report and Written Opinion issued in corresponding PCT application No. PCT/US2019/035393 dated Aug. 9, 2019, 12 pages.
(Continued)

Primary Examiner — Thanh Trug Trinh
(74) Attorney, Agent, or Firm — Weber Rosselli & Cannon LLP

(57) ABSTRACT

A solar tracking system is provided and includes a solar array, a plurality of support beams configured to support the solar array, a torque tube coupled to the plurality of support beams, a base configured to rotatably support the torque tube, and an articulation system configured to rotate the torque tube relative to the base. The articulation system includes a first helical tube coupled to the torque tube, a first helical tube support disposed on the base and configured to slidably support the first helical tube, and a gearbox in mechanical communication with the first helical tube. Actuation of the gearbox causes the first helical tube to translate within the first helical tube support and the first helical tube support is configured to rotate the first helical tube as the first helical tube is translated therein to cause a corresponding rotation of the solar array.

20 Claims, 22 Drawing Sheets

(51) Int. Cl.
*F16H 19/02* (2006.01)
*F24S 30/00* (2018.01)

(56) References Cited

U.S. PATENT DOCUMENTS

| | | | |
|---|---|---|---|
| 4,172,443 A | 10/1979 | Sommer | |
| 4,875,726 A | 10/1989 | Thau | |
| 4,936,611 A | 6/1990 | Palvolgyi | |
| 4,984,389 A | 1/1991 | Benoit et al. | |
| 5,000,495 A | 3/1991 | Wolfgang et al. | |
| 5,067,605 A | 11/1991 | Gordon | |
| 5,106,134 A | 4/1992 | Thau | |
| 5,197,589 A | 3/1993 | Gordon | |
| 5,317,145 A | 5/1994 | Corio | |
| 5,512,742 A | 4/1996 | Mattson | |
| 5,622,078 A | 4/1997 | Mattson | |
| 5,947,547 A | 9/1999 | Deeks et al. | |
| 6,029,977 A | 2/2000 | Sym | |
| 6,058,930 A | 5/2000 | Shingleton | |
| 6,105,316 A | 8/2000 | Bottger et al. | |
| 6,260,893 B1 | 7/2001 | Wilson | |
| 6,315,295 B1 | 11/2001 | Sym | |
| 6,365,277 B1 | 4/2002 | Wilson | |
| 6,454,974 B1 | 9/2002 | Wilson | |
| 6,558,605 B1 | 5/2003 | Wilson | |
| 6,563,040 B2 | 5/2003 | Hayden et al. | |
| 6,586,088 B1 | 7/2003 | Wilson | |
| 6,662,801 B2 | 12/2003 | Hayden et al. | |
| 6,682,811 B1 | 7/2004 | Wilson | |
| D496,248 S | 9/2004 | Liebendorfer | |
| D496,249 S | 9/2004 | Liebendorfer | |
| 6,872,432 B2 | 3/2005 | Wilson | |
| 6,923,482 B2 | 8/2005 | Cumming et al. | |
| 6,927,695 B2 | 8/2005 | Hayden | |
| 6,932,204 B2 | 8/2005 | Dolan | |
| 6,977,115 B1 | 12/2005 | Wilson | |
| 6,988,305 B1 | 1/2006 | Wilson | |
| 7,059,657 B2 | 6/2006 | Bodin et al. | |
| 7,169,467 B2 | 1/2007 | Wilson | |
| 7,170,025 B2 | 1/2007 | Gonzalez | |
| 7,172,238 B2 | 2/2007 | Bodin et al. | |
| 7,252,083 B2 | 8/2007 | Hayden | |
| 7,260,918 B2 | 8/2007 | Liebendorfer | |
| D560,605 S | 1/2008 | McClintock et al. | |
| D560,606 S | 1/2008 | McClintock et al. | |
| 7,316,432 B2 | 1/2008 | Muskos | |
| 7,316,446 B2 | 1/2008 | Wikstrom | |
| 7,344,008 B1 | 3/2008 | Jonsson et al. | |
| D565,505 S | 4/2008 | Shugar et al. | |
| 7,357,132 B2 | 4/2008 | Hayden | |
| 7,357,430 B2 | 4/2008 | Karlander | |
| 7,413,226 B2 | 8/2008 | Muskos | |
| D576,478 S | 9/2008 | Mead et al. | |
| 7,434,362 B2 | 10/2008 | Liebendorfer | |
| D586,737 S | 2/2009 | Shugar et al. | |
| 7,531,741 B1 | 5/2009 | Melton et al. | |
| 7,557,292 B2 | 7/2009 | Shingleton et al. | |
| D600,638 S | 9/2009 | Plaisted et al. | |
| D601,491 S | 10/2009 | Burtt | |
| 7,600,349 B2 | 10/2009 | Liebendorfer | |
| 7,611,175 B2 | 11/2009 | Tornberg | |
| 7,631,924 B2 | 12/2009 | Nilsson | |
| 7,647,924 B2 | 1/2010 | Hayden | |
| D611,895 S | 3/2010 | Plaisted et al. | |
| 7,678,208 B2 | 3/2010 | Bodin | |
| D613,243 S | 4/2010 | Burtt | |
| 7,721,492 B2 | 5/2010 | Plaisted et al. | |
| 7,748,175 B2 | 7/2010 | Liebendorfer | |
| 7,766,292 B2 | 8/2010 | Liebendorfer | |
| 7,793,996 B2 | 9/2010 | Karlander | |
| 7,793,997 B2 | 9/2010 | Karlander | |
| 7,794,006 B2 | 9/2010 | Karlander | |
| 7,836,879 B2 | 11/2010 | Mackamul | |
| 7,856,769 B2 | 12/2010 | Plaisted et al. | |
| 7,857,269 B2 | 12/2010 | Plaisted et al. | |
| D630,576 S | 1/2011 | Plaisted et al. | |
| 7,871,122 B2 | 1/2011 | Salomonsson | |
| 7,874,601 B2 | 1/2011 | Tanskanen | |
| 7,888,587 B2 | 2/2011 | Shingleton et al. | |
| 7,900,407 B2 | 3/2011 | Plaisted | |
| 7,905,526 B2 | 3/2011 | Asplund | |
| 7,938,462 B2 | 5/2011 | Nilsson | |
| 7,954,863 B2 | 6/2011 | Ahlin | |
| 7,958,886 B2 | 6/2011 | Barsun et al. | |
| 7,976,257 B2 | 7/2011 | Kufner | |
| 8,023,266 B2 | 9/2011 | Russell et al. | |
| D647,843 S | 11/2011 | Albritton et al. | |
| D648,425 S | 11/2011 | Plaisted et al. | |
| 8,052,100 B2 | 11/2011 | Zante et al. | |
| 8,061,762 B2 | 11/2011 | Arvidsson et al. | |
| 8,087,706 B2 | 1/2012 | Karlander et al. | |
| 8,096,595 B2 | 1/2012 | Muskos | |
| 8,096,596 B2 | 1/2012 | Steiner | |
| 8,101,849 B2 | 1/2012 | Almy et al. | |
| 8,123,265 B2 | 2/2012 | Nilsson | |
| D655,210 S | 3/2012 | Narayanamurthy et al. | |
| 8,128,044 B2 | 3/2012 | Liebendorfer | |
| 8,156,697 B2 | 4/2012 | Miros et al. | |
| 8,158,877 B2 | 4/2012 | Klein et al. | |
| 8,177,180 B2 | 5/2012 | Plaisted et al. | |
| 8,188,413 B2 | 5/2012 | Kats et al. | |
| 8,188,415 B2 | 5/2012 | Kats et al. | |
| 8,191,320 B2 | 6/2012 | Mittan et al. | |
| 8,191,943 B2 | 6/2012 | Hellstrom | |
| 8,203,110 B2 | 6/2012 | Silvestre Mata | |
| 8,220,580 B2 | 7/2012 | Isaksson et al. | |
| 8,230,850 B2 | 7/2012 | Barsun et al. | |
| 8,234,821 B2 | 8/2012 | Plaisted et al. | |
| 8,240,109 B2 | 8/2012 | Cusson et al. | |
| 8,246,090 B2 | 8/2012 | Loveborn | |
| 8,256,169 B2 | 9/2012 | Cusson et al. | |
| 8,256,170 B2 | 9/2012 | Plaisted et al. | |
| 8,266,848 B2 | 9/2012 | Miros et al. | |
| 8,274,028 B2 | 9/2012 | Needham | |
| 8,291,653 B2 | 10/2012 | Suarez et al. | |
| 8,292,354 B2 | 10/2012 | Bodin et al. | |
| 8,300,439 B2 | 10/2012 | Little et al. | |
| 8,304,644 B2 | 11/2012 | Wares et al. | |
| 8,316,590 B2 | 11/2012 | Cusson | |
| 8,344,239 B2 | 1/2013 | Plaisted | |
| 8,349,144 B2 | 1/2013 | Black et al. | |
| 8,382,199 B2 | 2/2013 | Bodin | |
| 8,383,943 B2 | 2/2013 | Little et al. | |
| D677,619 S | 3/2013 | Truthseeker et al. | |
| 8,397,448 B2 | 3/2013 | Brown et al. | |
| 8,407,950 B2 | 4/2013 | Hartelius | |
| 8,413,391 B2 | 4/2013 | Seery et al. | |
| 8,434,230 B2 | 5/2013 | Bodin et al. | |
| 8,453,328 B2 | 6/2013 | Kats et al. | |
| 8,459,249 B2 | 6/2013 | Corio | |
| 8,464,496 B2 | 6/2013 | Cusson et al. | |
| 8,465,088 B2 | 6/2013 | Bodin et al. | |
| D687,839 S | 8/2013 | Narayanamurthy | |
| D688,620 S | 8/2013 | Burtt | |
| 8,546,681 B2 | 10/2013 | Wares et al. | |
| 8,567,134 B1 | 10/2013 | Grushkowitz et al. | |
| 8,578,928 B2 | 11/2013 | Lumbreras | |
| 8,578,929 B2 | 11/2013 | Krabbe et al. | |
| 8,604,404 B1 | 12/2013 | Linderman | |
| 8,615,939 B2 | 12/2013 | Seery et al. | |
| D697,022 S | 1/2014 | Truthseeker et al. | |
| 8,640,400 B2 | 2/2014 | Liebendorfer | |
| 8,641,539 B2 | 2/2014 | Paponneau | |
| 8,650,812 B2 | 2/2014 | Cusson | |
| 8,656,659 B2 | 2/2014 | Plaisted | |
| 8,659,880 B2 | 2/2014 | Russell et al. | |
| 8,660,708 B2 | 2/2014 | Narayanamurthy et al. | |
| 8,665,610 B2 | 3/2014 | Kern | |
| 8,671,930 B2 | 3/2014 | Liao | |
| 8,684,449 B2 | 4/2014 | Bodin et al. | |
| 8,704,080 B2 | 4/2014 | Conchy et al. | |
| 8,712,745 B2 | 4/2014 | Wayne et al. | |
| 8,720,431 B2 | 5/2014 | Kufner | |
| 8,739,478 B1 | 6/2014 | Burtt et al. | |

(56) References Cited

U.S. PATENT DOCUMENTS

| | | |
|---|---|---|
| 8,745,936 B2 | 6/2014 | Plaisted et al. |
| 8,754,627 B1 | 6/2014 | Le |
| 8,757,567 B2 | 6/2014 | Ciasulli et al. |
| 8,763,968 B2 | 7/2014 | Liebendorfer |
| 8,771,421 B2 | 7/2014 | Rathweg |
| 8,776,781 B2 | 7/2014 | Meydbray |
| 8,789,872 B2 | 7/2014 | Johansson |
| 8,790,451 B1 | 7/2014 | Narayanamurthy |
| 8,806,813 B2 | 8/2014 | Plaisted et al. |
| 8,807,129 B2 | 8/2014 | Mackamul |
| 8,807,839 B2 | 8/2014 | Jang |
| 8,816,870 B2 | 8/2014 | Plaisted et al. |
| 8,839,573 B2 | 9/2014 | Cusson et al. |
| 8,857,173 B2 | 10/2014 | Beale |
| 8,878,112 B2 | 11/2014 | Lee |
| 8,887,920 B2 | 11/2014 | Pelman et al. |
| 8,904,734 B2 | 12/2014 | Lucas et al. |
| 8,922,185 B2 | 12/2014 | Ehlmann et al. |
| 8,936,264 B2 | 1/2015 | Koormann et al. |
| 8,939,648 B2 | 1/2015 | Schneider et al. |
| 8,946,541 B2 | 2/2015 | Wares et al. |
| 8,946,542 B1 | 2/2015 | Truthseeker et al. |
| 8,946,608 B2 | 2/2015 | Sherman |
| 8,953,350 B2 | 2/2015 | Kern |
| 8,968,496 B2 | 3/2015 | Larsson et al. |
| 8,988,182 B2 | 3/2015 | Kern |
| 8,993,870 B2 | 3/2015 | Eom |
| 9,027,289 B1 | 5/2015 | Burtt |
| 9,035,168 B2 | 5/2015 | Barton |
| 9,038,329 B2 | 5/2015 | Pelman et al. |
| 9,057,542 B2 | 6/2015 | Schuit et al. |
| 9,090,138 B2 | 7/2015 | Haselhorst et al. |
| 9,103,563 B1 | 8/2015 | Burtt |
| 9,127,330 B2 | 9/2015 | Krispinsson |
| 9,140,403 B2 | 9/2015 | Blitz et al. |
| 9,145,906 B2 | 9/2015 | Schuit et al. |
| 9,160,273 B2 | 10/2015 | Schuit et al. |
| 9,166,525 B2 | 10/2015 | Grant |
| 9,168,801 B2 | 10/2015 | Dicke et al. |
| 9,170,031 B2 | 10/2015 | West et al. |
| 9,184,324 B2 | 11/2015 | Wares et al. |
| 9,188,366 B2 | 11/2015 | Thurner et al. |
| 9,205,726 B2 | 12/2015 | Arvidsson |
| 9,234,364 B2 | 1/2016 | Abad Huber et al. |
| 9,243,818 B2 | 1/2016 | Shugar et al. |
| 9,249,925 B2 | 2/2016 | Roensch et al. |
| 9,252,307 B2 | 2/2016 | Hartelius |
| 9,252,314 B2 | 2/2016 | Wares et al. |
| 9,254,800 B2 | 2/2016 | Nilsson |
| 9,279,415 B1 | 3/2016 | Huber et al. |
| 9,279,457 B2 | 3/2016 | Grushkowitz |
| 9,279,521 B2 | 3/2016 | Miyatake et al. |
| 9,281,419 B2 | 3/2016 | Klein et al. |
| 9,281,431 B2 | 3/2016 | Linderman |
| 9,281,778 B2 | 3/2016 | Corio et al. |
| 9,303,663 B2 | 4/2016 | Greenamyer et al. |
| 9,303,684 B2 | 4/2016 | Clavijo Lumbreras |
| 9,322,436 B2 | 4/2016 | Tokunaga et al. |
| 9,322,437 B2 | 4/2016 | Agullo |
| 9,342,087 B2 | 5/2016 | Chen et al. |
| 9,343,592 B2 | 5/2016 | Hunt |
| 9,352,941 B2 | 5/2016 | Wheeler et al. |
| 9,391,380 B2 | 7/2016 | Little et al. |
| 9,395,103 B2 | 7/2016 | Conley et al. |
| 9,397,606 B2 | 7/2016 | Liebendorfer |
| 9,413,287 B2 | 8/2016 | Hartelius |
| 9,452,724 B2 | 9/2016 | Nilsson |
| 9,453,660 B2 | 9/2016 | French et al. |
| 9,453,899 B2 | 9/2016 | Paponneau |
| 9,455,661 B2 | 9/2016 | Meydbray |
| 9,455,663 B1 | 9/2016 | Carrington |
| 9,462,734 B2 | 10/2016 | Swahn et al. |
| 9,477,247 B2 | 10/2016 | Ehlmann et al. |
| 9,482,449 B2 | 11/2016 | Cole et al. |
| 9,505,443 B2 | 11/2016 | Bodin |
| 9,581,678 B2 | 2/2017 | Corio |
| 9,584,062 B2 | 2/2017 | Ganshaw et al. |
| 9,593,867 B2 | 3/2017 | Seery et al. |
| 9,601,645 B2 | 3/2017 | Seery et al. |
| 9,610,910 B2 | 4/2017 | Muskos |
| 9,615,470 B2 | 4/2017 | Sherwood et al. |
| 9,631,840 B2 | 4/2017 | Corio |
| 9,641,123 B2 | 5/2017 | Swahn et al. |
| 9,654,052 B2 | 5/2017 | Paponneau |
| 9,655,292 B2 | 5/2017 | Swahn et al. |
| 9,657,967 B2 | 5/2017 | Adriani et al. |
| 9,687,898 B2 | 6/2017 | Loesch |
| D792,342 S | 7/2017 | Purigraski et al. |
| 9,743,501 B2 | 8/2017 | Ciasulli et al. |
| 9,744,997 B2 | 8/2017 | Olofsson et al. |
| 9,746,655 B2 | 8/2017 | Wares et al. |
| D799,420 S | 10/2017 | Purigraski et al. |
| D800,537 S | 10/2017 | Harris |
| D800,544 S | 10/2017 | Schuit et al. |
| 9,803,893 B2 | 10/2017 | Giraudo et al. |
| 9,806,669 B2 | 10/2017 | Michotte De Welle |
| D801,781 S | 11/2017 | Schuit et al. |
| D801,913 S | 11/2017 | Bauer et al. |
| D801,914 S | 11/2017 | Bauer et al. |
| D801,915 S | 11/2017 | Bauer et al. |
| D803,040 S | 11/2017 | Schuit et al. |
| 9,819,301 B2 | 11/2017 | Agullo |
| 9,831,365 B2 | 11/2017 | Pelman et al. |
| 9,837,955 B1 | 12/2017 | Schuit et al. |
| D808,066 S | 1/2018 | Young |
| 9,927,150 B2 | 3/2018 | Eckl et al. |
| D815,303 S | 4/2018 | Schuit et al. |
| D815,308 S | 4/2018 | Schuit et al. |
| 9,937,846 B2 | 4/2018 | French et al. |
| 2004/0261334 A1 | 12/2004 | Liebendorfer et al. |
| 2005/0126621 A1 | 6/2005 | Dinwoodie et al. |
| 2007/0107767 A1 | 5/2007 | Hayden et al. |
| 2008/0185034 A1 | 8/2008 | Corio |
| 2008/0236570 A1 | 10/2008 | Kufner |
| 2008/0292424 A1 | 11/2008 | Kufner |
| 2009/0025708 A1 | 1/2009 | Shingleton |
| 2009/0134291 A1 | 5/2009 | Meier et al. |
| 2009/0232616 A1 | 9/2009 | Sekreta et al. |
| 2009/0260316 A1 | 10/2009 | Jones et al. |
| 2009/0320826 A1 | 12/2009 | Kufner |
| 2010/0059045 A1 | 3/2010 | Guinea Diaz et al. |
| 2010/0089390 A1 | 4/2010 | Miros et al. |
| 2010/0101559 A1 | 4/2010 | Grant et al. |
| 2010/0139741 A1 | 6/2010 | Wares |
| 2010/0179678 A1 | 7/2010 | Dinwoodie et al. |
| 2010/0193012 A1 | 8/2010 | Klammer et al. |
| 2010/0217724 A1 | 8/2010 | Wayne et al. |
| 2011/0044083 A1 | 2/2011 | Thompson |
| 2011/0138599 A1 | 6/2011 | Bellacicco et al. |
| 2011/0174295 A1 | 7/2011 | Lumbreras et al. |
| 2011/0220596 A1 | 9/2011 | Cusson et al. |
| 2011/0272367 A1 | 11/2011 | Kufner |
| 2011/0272368 A1 | 11/2011 | Kufner |
| 2012/0027550 A1 | 2/2012 | Bellacicco et al. |
| 2012/0031030 A1 | 2/2012 | Cusson et al. |
| 2012/0031039 A1 | 2/2012 | Cusson et al. |
| 2012/0073565 A1 | 3/2012 | Grant et al. |
| 2012/0097149 A1 | 4/2012 | Doyle |
| 2012/0124922 A1 | 5/2012 | Cusson et al. |
| 2012/0125399 A1 | 5/2012 | Schatz et al. |
| 2012/0187058 A1 | 7/2012 | Almy et al. |
| 2012/0216852 A1 | 8/2012 | Almy et al. |
| 2012/0266938 A1 | 10/2012 | Goei et al. |
| 2012/0266940 A1 | 10/2012 | Grant et al. |
| 2013/0037081 A1 | 2/2013 | Grant |
| 2013/0037082 A1 | 2/2013 | Grant |
| 2013/0088329 A1 | 4/2013 | Chrysostom et al. |
| 2013/0098858 A1 | 4/2013 | Cusson et al. |
| 2013/0112239 A1 | 5/2013 | Liptac et al. |
| 2013/0269752 A1 | 10/2013 | Corio |
| 2013/0269753 A1 | 10/2013 | Corio |
| 2014/0000705 A1 | 1/2014 | Sounni et al. |
| 2014/0020734 A1 | 1/2014 | Baker et al. |
| 2014/0090638 A1 | 4/2014 | Grushkowitz |

(56) References Cited

U.S. PATENT DOCUMENTS

| | | |
|---|---|---|
| 2014/0140755 A1 | 5/2014 | Clavijo Lumbreras et al. |
| 2014/0151312 A1 | 6/2014 | Cusson et al. |
| 2014/0174533 A1 | 6/2014 | Buller et al. |
| 2014/0263899 A1 | 9/2014 | Harris et al. |
| 2014/0270979 A1 | 9/2014 | Cusson et al. |
| 2014/0290716 A1 | 10/2014 | Stubbs |
| 2014/0318605 A1 | 10/2014 | Huzyak et al. |
| 2014/0338722 A1 | 11/2014 | Feldman-Peabody et al. |
| 2014/0375132 A1 | 12/2014 | Agarwal et al. |
| 2015/0000725 A1 | 1/2015 | Reilly et al. |
| 2015/0040944 A1 | 2/2015 | Dinwoodie et al. |
| 2015/0082924 A1 | 3/2015 | Morgan |
| 2015/0090378 A1 | 4/2015 | Eriksson et al. |
| 2015/0101655 A1 | 4/2015 | Schuit et al. |
| 2015/0117067 A1 | 4/2015 | Naiknaware et al. |
| 2015/0121784 A1 | 5/2015 | Abad Huber et al. |
| 2015/0136205 A1 | 5/2015 | Worden |
| 2015/0144156 A1 | 5/2015 | French et al. |
| 2015/0165544 A1 | 6/2015 | Molina Mesa et al. |
| 2015/0171786 A1 | 6/2015 | Worden |
| 2015/0200619 A1 | 7/2015 | Worden |
| 2015/0203963 A1 | 7/2015 | Powell |
| 2015/0207452 A1 | 7/2015 | Werner et al. |
| 2015/0239061 A1 | 8/2015 | Hamlock et al. |
| 2015/0316639 A1 | 11/2015 | Russ et al. |
| 2015/0349706 A1 | 12/2015 | Grossman et al. |
| 2015/0355017 A1 | 12/2015 | Clarke et al. |
| 2015/0377518 A1 | 12/2015 | Maxey et al. |
| 2015/0377520 A1 | 12/2015 | Kufner |
| 2016/0013751 A1 | 1/2016 | Michotte de Welle et al. |
| 2016/0028345 A1 | 1/2016 | Wares et al. |
| 2016/0044843 A1 | 2/2016 | Swahn et al. |
| 2016/0065121 A1 | 3/2016 | Bugg et al. |
| 2016/0065123 A1 | 3/2016 | Hayes et al. |
| 2016/0079907 A1 | 3/2016 | Russell et al. |
| 2016/0099572 A1 | 4/2016 | Gupta et al. |
| 2016/0102891 A1 | 4/2016 | Paponneau |
| 2016/0104084 A1 | 4/2016 | Philip et al. |
| 2016/0118933 A1 | 4/2016 | Russell et al. |
| 2016/3011665 | 4/2016 | Wheeler |
| 2016/0124067 A1 | 5/2016 | Paponneau |
| 2016/0140282 A1 | 5/2016 | Morse et al. |
| 2016/0140283 A1 | 5/2016 | Morse et al. |
| 2016/0190976 A1 | 6/2016 | Corio et al. |
| 2016/0195303 A1 | 7/2016 | Lambert et al. |
| 2016/0204733 A1 | 7/2016 | Agullo |
| 2016/0218662 A1 | 7/2016 | Deger et al. |
| 2016/0218663 A1 | 7/2016 | Werner et al. |
| 2016/0254673 A1 | 9/2016 | Batten et al. |
| 2016/0260848 A1 | 9/2016 | Schuh |
| 2016/0261225 A1 | 9/2016 | Paponneau |
| 2016/0261232 A1 | 9/2016 | Grushkowitz et al. |
| 2016/0285415 A1 | 9/2016 | Hunt |
| 2016/0301356 A1 | 10/2016 | Liebendorfer |
| 2016/0308488 A1 | 10/2016 | Liu et al. |
| 2016/0322827 A1 | 11/2016 | Gupta et al. |
| 2016/0322829 A1 | 11/2016 | Klein et al. |
| 2016/0327091 A1* | 11/2016 | Cowles, Jr. ............... F16C 19/38 |
| 2016/0329860 A1 | 11/2016 | Kalus et al. |
| 2016/0336900 A1 | 11/2016 | Paponneau et al. |
| 2016/0365823 A1 | 12/2016 | French et al. |
| 2016/0365830 A1 | 12/2016 | Bailey et al. |
| 2016/0370033 A1 | 12/2016 | Mateille et al. |
| 2017/0005614 A1 | 1/2017 | Cole et al. |
| 2017/0012437 A1 | 1/2017 | Ehlmann et al. |
| 2017/0019060 A1 | 1/2017 | Dinwoodie et al. |
| 2017/0040928 A1 | 2/2017 | Schuit et al. |
| 2017/0040931 A1 | 2/2017 | Schuit et al. |
| 2017/0047885 A1 | 2/2017 | Swahn et al. |
| 2017/0050272 A1 | 2/2017 | Holmberg et al. |
| 2017/0054407 A1 | 2/2017 | Swahn et al. |
| 2017/0063288 A1 | 3/2017 | Schuit et al. |
| 2017/0066394 A1 | 3/2017 | Nilsson |
| 2017/0066481 A1 | 3/2017 | Bodin |
| 2017/0073911 A1 | 3/2017 | Holland et al. |
| 2017/0080523 A1 | 3/2017 | Andersson et al. |
| 2017/0102168 A1 | 4/2017 | Childress |
| 2017/0111006 A1 | 4/2017 | Vietas et al. |
| 2017/0126168 A1 | 5/2017 | Worden |
| 2017/0126169 A1 | 5/2017 | Worden |
| 2017/0133975 A1 | 5/2017 | Ganshaw et al. |
| 2017/0146264 A1 | 5/2017 | Ingram |
| 2017/0149373 A1 | 5/2017 | Aghatehrani et al. |
| 2017/0149375 A1 | 5/2017 | Bailey et al. |
| 2017/0155356 A1 | 6/2017 | Schuit et al. |
| 2017/0159318 A1 | 6/2017 | Cusson et al. |
| 2017/0160372 A1 | 6/2017 | Corio |
| 2017/0163209 A1 | 6/2017 | Bailey et al. |
| 2017/0170777 A1 | 6/2017 | Dinwoodie et al. |
| 2017/0187192 A1 | 6/2017 | Jeanty et al. |
| 2017/0234580 A1 | 8/2017 | Worden |
| 2017/0237388 A1 | 8/2017 | Praca et al. |
| 2017/0252791 A1 | 9/2017 | Loesch |
| 2017/0257057 A1 | 9/2017 | Swahn et al. |
| 2017/0269919 A1 | 9/2017 | Cherukupalli et al. |
| 2017/0272029 A1 | 9/2017 | Liebendorfer |
| 2017/0279405 A1 | 9/2017 | Wares |
| 2017/0314819 A1 | 11/2017 | Adriani et al. |
| 2017/0331414 A1 | 11/2017 | Bailey et al. |
| 2017/0338768 A1 | 11/2017 | Prakash et al. |
| 2017/0353146 A1* | 12/2017 | Praca ..................... F16H 21/44 |
| 2017/0359017 A1 | 12/2017 | Corio |
| 2017/0373632 A1 | 12/2017 | Bauer et al. |
| 2018/0013380 A1 | 1/2018 | Childress et al. |
| 2018/0029549 A1 | 2/2018 | Palo |
| 2018/0054066 A1 | 2/2018 | Ehlmann et al. |
| 2018/0062563 A1 | 3/2018 | Bapat et al. |
| 2018/0062564 A1 | 3/2018 | Grushkowitz et al. |
| 2018/0062565 A1 | 3/2018 | Schimelpfenig et al. |
| 2018/0062566 A1 | 3/2018 | Grushkowitz et al. |
| 2018/0062567 A1 | 3/2018 | Oh et al. |
| 2018/0062569 A1 | 3/2018 | Oh et al. |
| 2018/0073773 A1 | 3/2018 | Grushkowitz et al. |
| 2018/0087908 A1 | 3/2018 | Bailey et al. |
| 2018/0091087 A1 | 3/2018 | Bailey et al. |
| 2018/0091088 A1 | 3/2018 | Barton et al. |
| 2018/0175783 A1* | 6/2018 | Schimelpfenig ........ H02S 20/32 |

FOREIGN PATENT DOCUMENTS

| | | |
|---|---|---|
| CN | 104993002 A | 10/2015 |
| CN | 204810206 U | 11/2015 |
| CN | 204885197 U | 12/2015 |
| CN | 105242693 A | 1/2016 |
| CN | 204948015 U | 1/2016 |
| CN | 106410957 A | 2/2017 |
| CN | 106602989 A | 4/2017 |
| CN | 206117576 U | 4/2017 |
| CN | 206117579 U | 4/2017 |
| CN | 106656009 A | 5/2017 |
| CN | 106788180 A | 5/2017 |
| CN | 106788182 A | 5/2017 |
| CN | 206293452 U | 6/2017 |
| CN | 206294126 U | 6/2017 |
| CN | 206299691 U | 7/2017 |
| CN | 206299703 U | 7/2017 |
| CN | 206301216 U | 7/2017 |
| CN | 206302372 U | 7/2017 |
| CN | 107063448 A | 8/2017 |
| CN | 206370808 U | 8/2017 |
| CN | 206412976 U | 8/2017 |
| CN | 206472091 U | 9/2017 |
| CN | 206506474 U | 9/2017 |
| CN | 206506480 U | 9/2017 |
| CN | 107294482 A | 10/2017 |
| CN | 206575370 U | 10/2017 |
| CN | 107387579 A | 11/2017 |
| CN | 107425805 A | 12/2017 |
| CN | 107656549 A | 2/2018 |
| WO | 2015025065 A1 | 2/2015 |
| WO | 2017044566 A1 | 3/2017 |
| WO | 2017091471 A1 | 6/2017 |
| WO | 2017200917 A1 | 11/2017 |
| WO | 2017210265 A1 | 12/2017 |

(56) References Cited

FOREIGN PATENT DOCUMENTS

| WO | 2018009634 A1 | 1/2018 |
|----|---------------|--------|
| WO | 2018009642 A1 | 1/2018 |
| WO | 2018009650 A1 | 1/2018 |
| WO | 2018071332 A1 | 4/2018 |

OTHER PUBLICATIONS

"Axus Solar Tracker Data Sheet" available at http://www.axsussolar.com/#intro [retrieved on Sep. 12, 2018].
Examination Report issued in Australian Patent Application No. 2019282152 dated Jun. 23, 2021, 5 pages.
Notice of Acceptance issued in Australian Patent application No. 2019282152 dated Sep. 16, 2021, 4 pages.
First Examination Report issued in Indian Patent Application No. 202017052270 dated Dec. 10, 2021, 7 pages.

\* cited by examiner

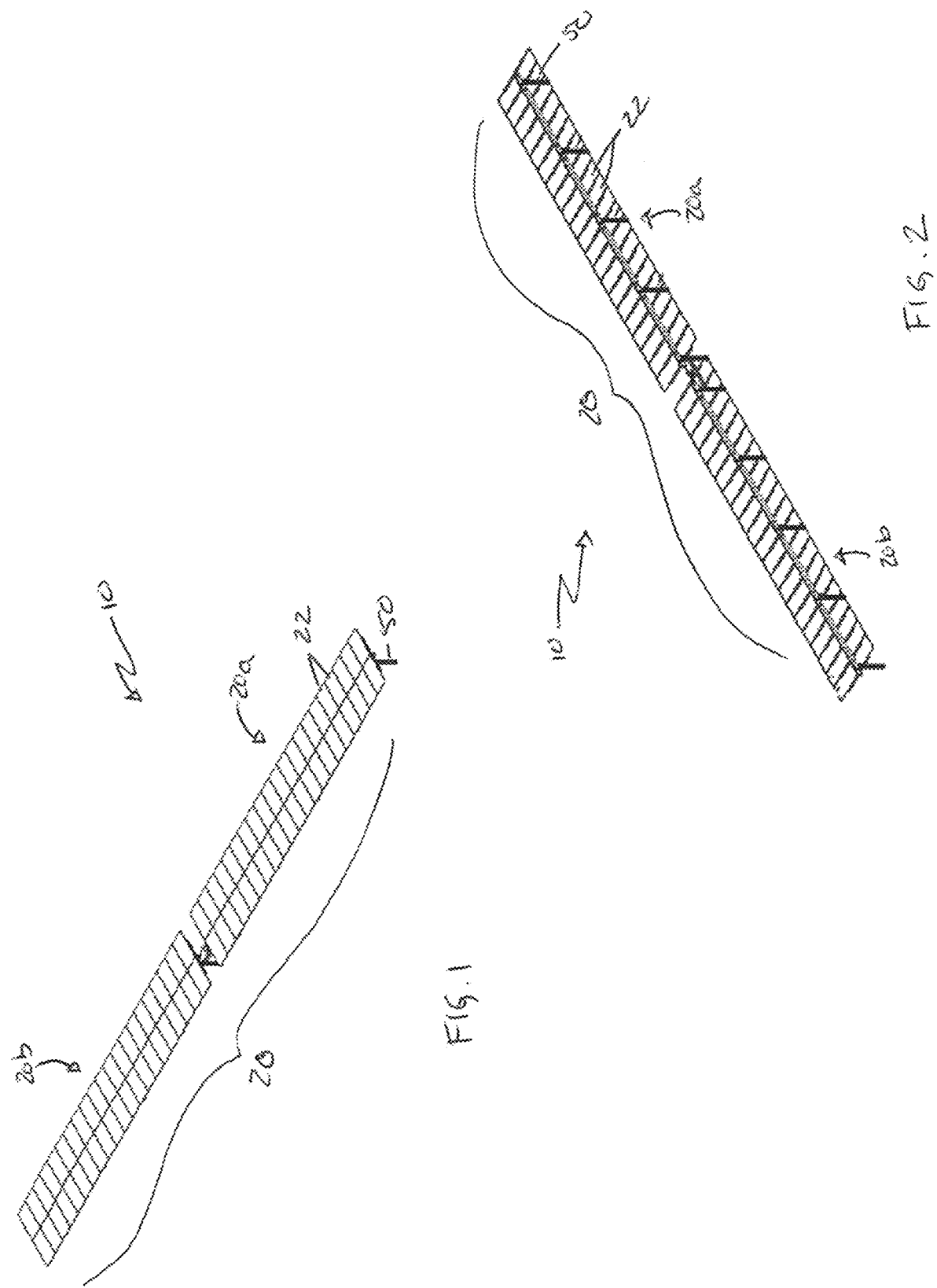

HELICAL ACTUATOR SYSTEM FOR SOLAR TRACKER

BACKGROUND

Technical Field

The present disclosure relates to solar systems, and more particularly, to solar tracker actuating systems for adjusting the orientation of the solar system to track the location of the sun.

Description of Related Art

Solar cells and solar panels are most efficient in sunny conditions when oriented towards the sun at a certain angle. Many solar panel systems are designs in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length.

Adjusting massive solar trackers requires power to drive the solar array as it follows the sun. As will be appreciated, the greater the load, the greater the amount of power necessary to drive the solar tracker. An additional design constraint of such systems is the rigidity required to accommodate the weight of the solar arrays and at times significant wind loading.

Further, the torsional excitation caused by wind loading exerts significant force upon the structure for supporting and the mechanisms for articulating the solar tracker. As such, increases in the size and number of components to reduce torsional excitation are required at varying locations along the length of the solar tracker. The present disclosure seeks to address the shortcomings of prior tracker systems.

SUMMARY

The present disclosure is directed to a solar tracking system including a solar array, a plurality of support beams configured to support the solar array, a torque tube coupled to the plurality of support beams, a base configured to rotatably support the torque tube, and an articulation system configured to rotate the torque tube relative to the base. The articulation system includes a first helical tube coupled to the torque tube, a first helical tube support disposed on the base and configured to slidably support the first helical tube, and a gearbox in mechanical communication with the first helical tube. Actuation of the gearbox causes the first helical tube to translate within the first helical tube support and the first helical tube support is configured to rotate the first helical tube as the first helical tube is translated therein to cause a corresponding rotation of the solar array.

In aspects, the first helical tube may define a helical portion that follows a helical arc wound about a longitudinal axis defined by the first helical tube.

In other aspects, the first helical tube support may include a plurality of rollers rotatably supported thereon. The plurality of rollers is configured to abut an outer surface of the helical portion of the first helical tube.

In certain aspects, the articulation system may include a second helical tube coupled to the torque tube and a second helical tube support disposed on the base and configured to slidably support the second helical tube.

In other aspects, the second helical tube may define a helical portion that follows a helical arc wound about a longitudinal axis defined by the second helical tube.

In aspects, the second helical tube support may include a plurality of rollers rotatably supported thereon that is configured to abut an outer surface of the helical portion of the second helical tube.

In certain aspects, the articulation system may include a power screw having a threaded outer surface extending between a first end portion and a second, opposite end portion. The power screw is rotatably coupled to the gearbox, wherein the first end portion of the power screw is threadably coupled to the first helical tube and the second end portion of the power screw is threadably coupled to the second helical tube.

In other aspects, the power screw may define a first threaded outer surface adjacent the first end portion and a second threaded outer surface adjacent the second end portion. The first threaded end portion is threaded in an opposite direction to the second threaded end portion such that as the power screw is rotated in a first direction, the power screw draws the first and second helical portion toward one another and as the power screw is rotated in a second direction the power screw pushes the first and second helical portions away from one another.

In aspects, the helical portion of the first and second helical tubes may be configured to rotate the first and second helical tubes approximately 100 degrees over a length of approximately 35 inches.

In other aspects, the plurality of rollers of the first and second helical tube supports may define an hourglass profile.

In certain aspects, the plurality of rollers of the first and second helical tube supports may define a cylindrical profile.

According to another aspects of the present disclosure a solar tracking system includes a solar array, a plurality of support beams configured to support the solar array, a torque tube coupled to the plurality of support beams, a base configured to rotatably support the torque tube, and an articulation system configured to rotate the torque tube relative to the base. The articulation system includes a helical tube coupled to the torque tube and a gearbox disposed on the base and configured to rotatably support the helical tube. The gearbox is in mechanical communication with the helical tube such that actuation of the gearbox causes the helical tube to translate within the gearbox. The gearbox is configured to rotate the helical tube as the helical tube is translated therewithin to cause a corresponding rotation of the solar array.

In aspects, the helical tube may define a helical portion that follows a helical arc wound about a longitudinal axis defined by the helical tube.

In other aspects, the gearbox may include a plurality of rollers rotatably supported thereon. The plurality of rollers is configured to abut an outer surface of the helical portion of the helical tube.

In certain aspects, the outer surface of the helical tube may define an plurality of threads thereon.

In other aspects, the plurality of threads of the helical tube may follow an arc wound about the longitudinal axis of the helical tube.

In aspects, the gearbox may include a pinion gear configured to engage the plurality of threads of the helical tube.

In other aspects, the articulation system may include a motor in mechanical communication with the pinion gear such that actuation of the motor causes rotation of the pinion gear, which in turn causes translation of the helical tube within the gearbox.

In aspects, the outer surface of the helical tube may define a single or a plurality of helical channels that follow an arc wound about the longitudinal axis of the helical tube.

In certain aspects, each channel of the plurality of channels of the helical tube may be configured to receive a portion of a corresponding roller of the plurality of rollers of the gearbox.

BRIEF DESCRIPTION OF THE DRAWINGS

Various aspects and features of the present disclosure are described hereinbelow with reference to the drawings, wherein:

FIG. 1 is a top, perspective view of a solar tracking system provided in accordance with the present disclosure that is configured to articulate the angle of a solar array to track the location of the sun;

FIG. 2 is a bottom, perspective view of the solar tracking system of FIG. 1;

DETAILED DESCRIPTION

Figure 3:
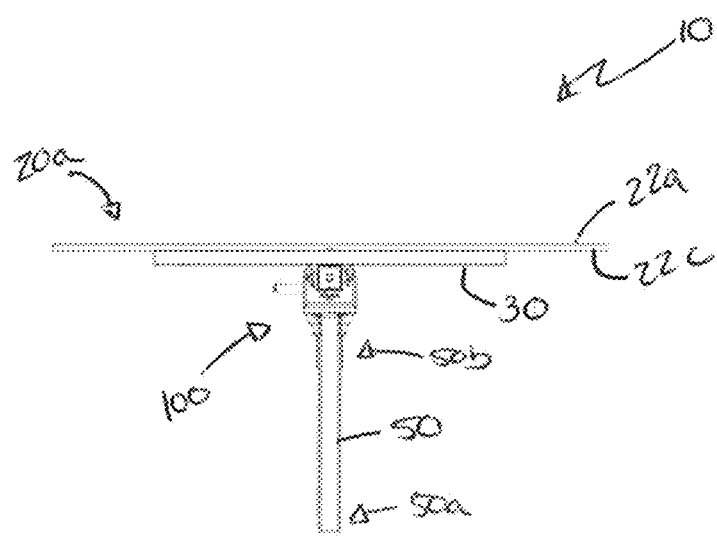
FIG. 3 is an end view of the solar tracking system of FIG. 1 shown with a solar array of the solar tracking system in a horizontal orientation.
Figure 4:
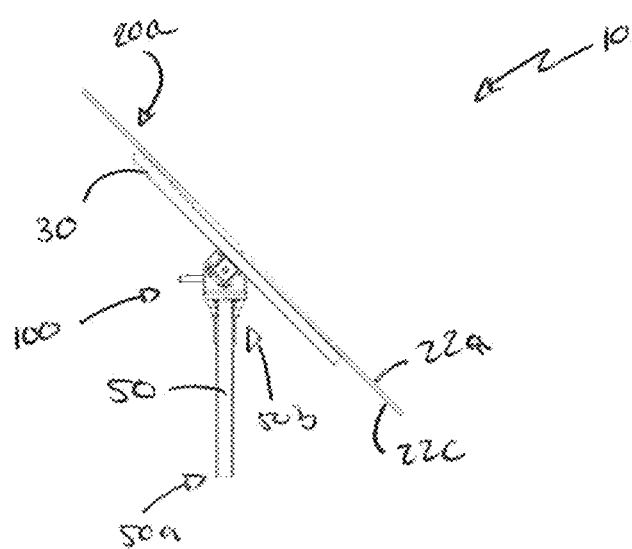
FIG. 4 is a side view of the solar tracking system of FIG. 1 shown with the solar array of the solar tracking system in an articulated orientation.
Figure 5:
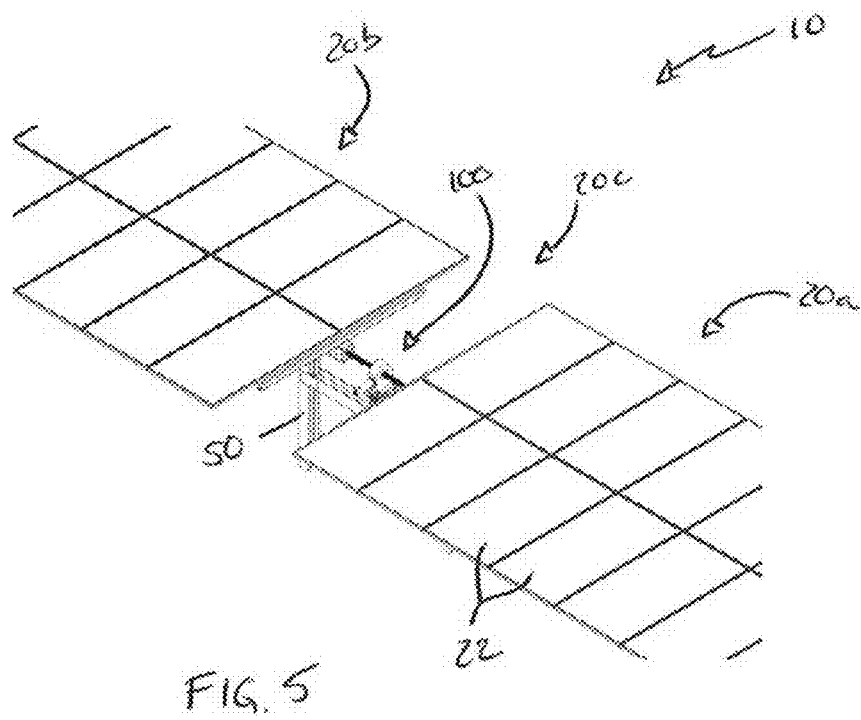
FIG. 5 is a top, perspective view of the solar tracking system of FIG. 1 showing an articulation system.

The present disclosure is directed to solar tracking systems and methods for articulating a solar tracking system. The solar tracking system includes a solar array that is supported by a plurality of support beams. The plurality of support beams, in turn, is supported by a plurality of torque tubes. The plurality of torque tubes are coupled to an articulation system, which in turn, is supported by a plurality of bases that is configured to be anchored in the ground or to a stationary structure. The articulation system includes a first and second helical tube and a corresponding first and second helical tube support. The first and second helical tubes are coupled to a respective torque tube at a first end portion and to a power screw at a second, opposite end portion. The first and second helical tubes include a corresponding helical portion that follows an arc wound about a longitudinal axis defined by each of the first and second helical tubes. The helical portion is wound about the longitudinal axis for approximately one revolution over its length, and in embodiments may be wound 100 degrees over its length. The helical portion includes a pitch such that the helical portion is wound 100 degrees over a length of 35 inches. The first and second helical tubes have helical portions that are wound in different directions (e.g., right and left hand directions or vice versa), such that as the helical tubes are translated in opposing directions within a corresponding helical tube support of the first and second helical tube supports the torque tubes are caused to be rotated in the same direction.

The helical tube support includes a through-hole that has a plurality of rollers that is rotatably supported on an inner surface thereof. The plurality of rollers is configured to abut an outer surface of a helical portion of the first and second helical tubes such that as the first and second helical tubes are translated within the through-bore of the helical tube supports, the plurality of rollers abut the outer surface of the helical portion and cause the first and second helical tubes to rotate. As can be appreciated, rotation of the helical tubes causes a corresponding rotation of the torque tube, which in turn, causes rotation of the solar array to orient the solar array towards the position of the sun.

The articulation system includes a gearbox and a power screw that is rotatably coupled thereto. The power screw includes a first threaded portion on one side of the gearbox and a second threaded portion on the opposite side of the gearbox. The first and second threaded portions of the power screw are threaded in opposite directions (e.g., right hand thread and left hand thread or vice versa) such that as the power screw is rotated by the gearbox in a first direction, the opposing direction of the threads of the first and second threaded portions cause the first and second helical tubes to be drawn towards one another and when the power screw is rotated by the gearbox in a second, opposite direction, the first and second helical tubes are pushed away from one another.

In aspects, the articulation system may include one helical tube which includes a plurality of threads disposed on an outer surface thereof. The plurality of threads is wound about the longitudinal axis of the helical tube and is configured to engage a pinion gear rotatably supported in the gearbox. In this manner, as the pinion gear is caused to be rotated, the teeth of the pinion gear engage the plurality of threads of the helical tube and drive the helical tube in an axial direction within the gearbox. The gearbox includes a plurality of rollers in a similar manner to the helical tube supports described above, such that translation of the helical tube within the gearbox causes the helical tube to rotate therein.

In another aspect, the outer surface of the helical tube may define a plurality of helical channels that is configured to receive corresponding rollers of the plurality of rollers. In this manner, the plurality of helical channels act as a cam, such that the plurality of rollers follow the path of the plurality of helical channels and cause the helical tube to rotate within the gearbox of helical tube supports.

As can be appreciated, utilizing a helical tube increases the overall stiffness of the articulation system and inhibits backdriving of the articulation system due to wind loads or static loads such as wildlife, snow, or other objects. The increases stiffness further enables the various components of the solar tracking system to be optimized, thus reducing the amount of material required and reducing costs.

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

With reference to FIGS. 1-16, a solar tracking system capable of tracking the location of the sun provided in accordance with the present disclosure is illustrated and generally identified by reference numeral 10. The solar tracking system 10 includes a solar array 20, a plurality of support beams 30 (FIG. 10) that is configured to support the solar array 20, a plurality of torque tubes 40 (FIG. 10) that is configured to support the plurality of support beams 30 (FIG. 10), a plurality of bases 50 that is configured to rotatably support the plurality of torque tubes 40, and an articulation system 100 (FIG. 8) that is configured to rotate the plurality of torque tubes 40, and therefore the solar array 20, relative to the base 50.

As illustrated in FIG. 1, the solar array 20 is broken up into a first portion 20a and a second portion 20b, where the first and second portions 20a, 20b are spaced apart from one another along the length thereof defining a gap 20c therebetween. Each portion of the first and second portions 20a, 20b is substantially similar, thus, only the first portion 20a will be described in detail hereinbelow in the interest of brevity. The first portion 20a of the solar array 20 includes a plurality of photovoltaic modules 22, each of which is mechanically and electrically coupled to one another, although it is contemplated that each photovoltaic module 22 may be mechanically and/or electrically insulated from one another. In embodiments, the photovoltaic modules 22 may be any suitable photovoltaic module capable of generating electrical energy from sunlight, such as monocrystalline silicon, polycrystalline silicon, thin-film, etc. The photovoltaic modules 22 define an upper surface 22a and an opposite, bottom surface 22b. As can be appreciated, the upper surface 22a of the photovoltaic modules 22 includes the photovoltaic cells (not shown) while the bottom surface 22b includes any suitable means for fixedly or selectively coupling the photovoltaic modules 22 to the plurality of support beams 30, such as mechanical fasteners (e.g., bolts, nuts, etc.), adhesives, welding, etc. In embodiments, the photovoltaic cells may be disposed within a suitable frame 22c (FIG. 10) which includes suitable means for fastening the photovoltaic modules 22 to the plurality of support beams 30. In this manner, the frame 22c may include fastening means on a bottom surface thereof, or clamps or other suitable fasteners (e.g., Z-brackets, C-clamps, angle brackets, etc.) may be utilized to abut a portion of the frame 22c and selectively or fixedly couple the frame 22c to the plurality of support beams 30.

Figure 10:
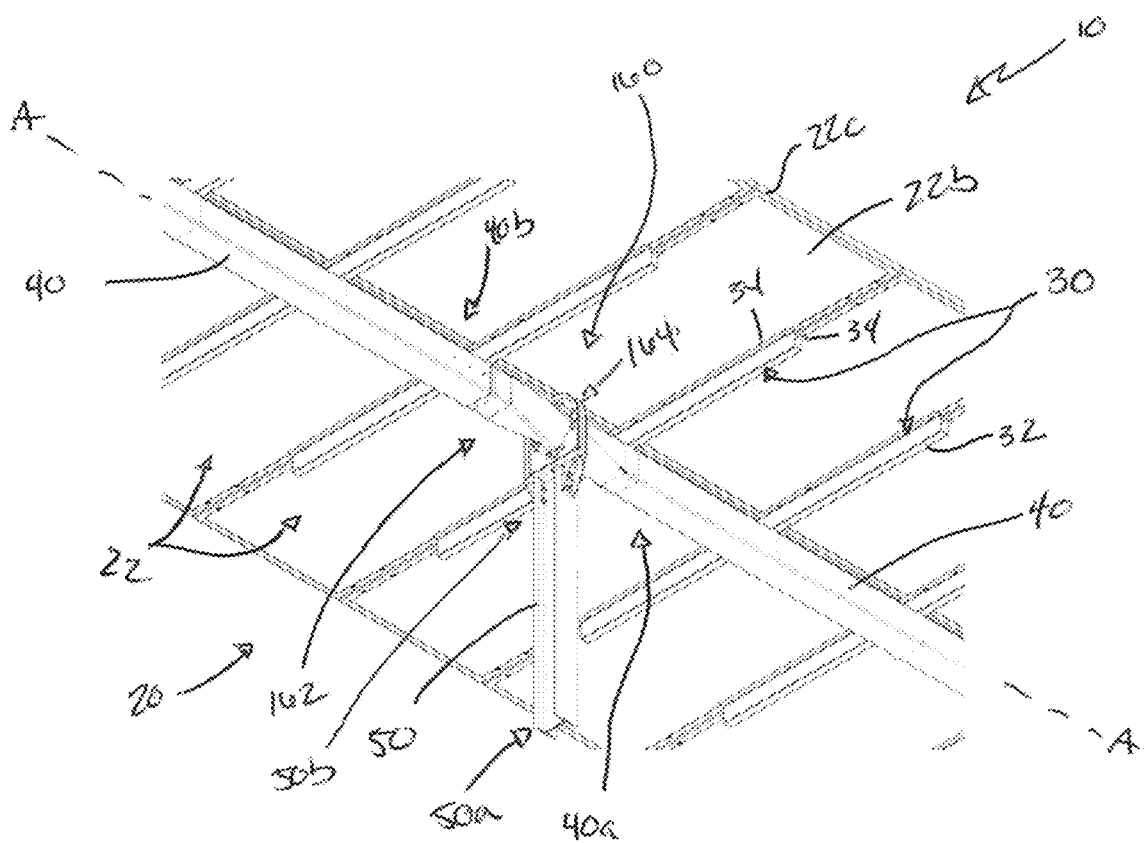
FIG. 10 is a bottom, perspective view of the solar tracking system of FIG. 1 showing the articulation system of FIG. 5.
Figure 11:
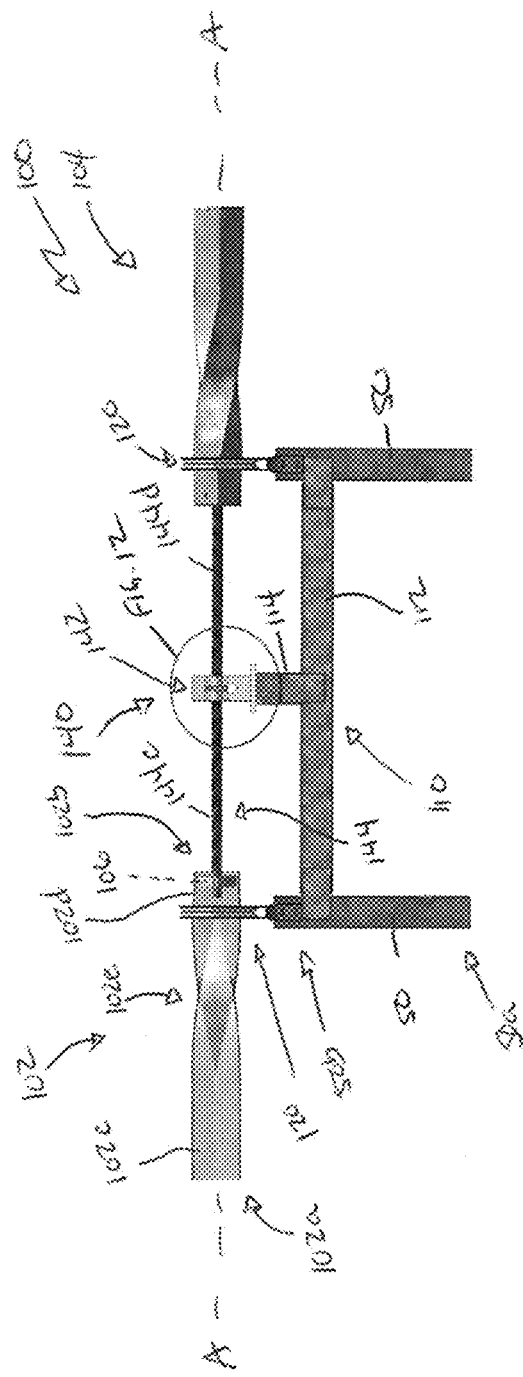
FIG. 11 is a side view of the solar tracking system of FIG. 1 showing the articulation system of FIG. 5.

Each beam of the plurality of support beams 30 is substantially similar, and thus, only one support beam will be described in detail hereinbelow in the interest of brevity. As illustrated in FIG. 10, the support beam 30 defines a generally U-shaped profile having a generally planar lower surface 32 and a pair of out-turned flanges 34 disposed on an opposite, upper surface. The lower surface 32 of the support beam 30 is configured to abut a portion of a respective torque tube of the plurality of torque tubes 40 such that the torque tube 40 supports the support beam 30. Each flange of the pair of out-turned flanges 34 is configured to support a portion of a respective frame 22c of the photovoltaic modules 22. In this manner, a first flange of the pair of out-turned flanges 34 supports a frame 22c of a first photovoltaic module 22 and a second, opposite flange of the pair of out-turned flanges 34 supports a frame 22c of a second, separate photovoltaic module 22 disposed adjacent to the first photovoltaic module 22. Although generally illustrated as having a generally U-shaped profile, it is contemplated that the support beam 30 may include any suitable profile, such as square, rectangular, oval, etc. It is envisioned that the support beam 30 may be selectively or fixedly coupled to the torque tube 40 and/or frames 22c of the photovoltaic modules 22 using any suitable means, such as mechanical fasteners (e.g., bolts, clamps, etc.), adhesives, welding, etc. In one non-limiting embodiment, the support beam 30 is coupled to the torque tube using a U-bolt or other similar fastener.

With reference to FIGS. 7-10, each tube of the plurality of torque tubes 40 is substantially similar and, thus, only one torque tube 40 will be described in detail hereinbelow in the interest of brevity. The torque tube 40 defines a generally tubular configuration having a generally square profile, although it is contemplated that the torque tube 40 may have any suitable profile, such as rectangular, circular, oval, etc. The torque tube 40 extends between a first end portion 40a and a second, opposite end portion 40b defining a longitudinal axis A-A. It is contemplated that the torque tube 40 may be formed from any material suitable for use outdoors, such as steel (e.g., galvanized, stainless, etc.), aluminum, composites, polymers, etc. Each of the first and second end portions 40a, 40b is configured to selectively or fixedly receive a portion of a passive helical tube 162 (FIG. 10) or an endcap 106 or 108 (FIG. 7) of the articulation system 100, as will be described in further detail hereinbelow.

Turning to FIG. 10, each base of the plurality of bases 50 is substantially similar and, thus, only one base 50 will be described in detail hereinbelow in the interest of brevity. The base 50 is shown generally as being an I-beam, although it is contemplated that any suitable type of beam may be used, such as a U-channel, Box tubes, round tubes, etc. Each base 50 includes a first end portion 50a that is configured to be anchored in the ground or to a stationary object and a second, opposite end portion 50b that is configured to selectively or fixedly couple to a portion of the articulation system 100, as will be described in further detail hereinbelow. It is contemplated that the base 50 may be formed from any material suitable for use outdoors and ground contact, such as steel (e.g., galvanized, stainless, etc.), aluminum, composites, polymers, etc.

Although generally illustrated as being supported at a geometric center of rotation, it is contemplated that the solar array 20 may be rotatably supported at a center of mass. In this manner, the mass of the solar array 20 is balanced about the plurality of bases 50 and the torque required to rotate the solar array about the plurality of bases remains substantially consistent, with little to no variation in the torque required to articulate the solar array 20 through its range or motion. As such, the amount of energy required to articulate the solar array 20 is reduced and the various components required to support the solar array 20 may be substantially similar (e.g., no need to design certain components to take a larger load than others), thereby reducing design time and reducing the number of differing components in the solar tracking system 10.

Referring to FIGS. 6-12, the articulation system 100 includes a first helical tube 102, a second helical tube 104, a first threaded end cap 106, a second threaded end cap 108, a support structure 110, a power screw driver assembly 140, and a passive articulation system 160. The first helical tube 102 defines a generally square profile extending between a first end portion 102a and a second, opposite end portion 102b along the longitudinal axis A-A. The first helical tube 102 defines a first linear portion 102c adjacent the first end portion 102a that is configured to selectively or fixedly engage a first or second end portion 40a, 40b of a respective torque tube 40 and a second linear portion 102d adjacent the second end portion 102b that is configured to selectively or fixedly engage the first threaded end cap 106. It is contemplated that first and second linear portions 102c, 102d of the first helical tube 102 may be coupled to the first or second end portions 40a, 40b of the torque tube or the first threaded end cap 106 using any suitable means, such as fasteners, friction fit, adhesives, welding, etc.

The generally square profile of the first helical tube 102 defines a twisted or helical portion 102e interposed between the first and second linear portions 102c, 102d. The helical portion 102e follows a helical arc wound about the longitudinal axis A-A such that the helical portion 102e completes approximately one revolution (e.g., twisted approximately 90 degrees over its length) from the first linear portion 102c to the second linear portion 102d. In one non-limiting embodiment, the helical portion 102e may define a helical arc that is wound about the longitudinal axis A-A approximately 100 degrees, although it is envisioned that the helical portion 102e may complete any number of revolutions (e.g., greater or less than one revolution) depending upon the installation needs of the solar tracking system 10. As can be appreciated, the pitch of the helical portion 102e determines the amount of force required to translate, and thereby rotate, the helical portion 102e through a respective support cam, as will be described in further detail hereinbelow. As such, the pitch (e.g., the length over which the helix completes one revolution) of the helical portion 102e may be adjusted and/or optimized to require smaller or larger motors, components, etc. In this manner, a larger pitch (e.g., longer helical portion 102e) would require less force to cause rotation of the first helical tube 102. However, the limited space in which the articulation system 100 may be placed in the solar tracker system 10 limits the length of the pitch, and in one non-limiting embodiment, the pitch utilized causes the first helical tube 102 to rotate approximately 100 degrees over a length of approximately 35 inches.

The second helical tube 104 is substantially similar to the first helical tube 102 except that the second helical tube 104 is wound in an opposite direction to the first helical tube 102 (e.g., the first helical tube 102 may be right handed and the second helical tube 104 left handed, or vice versa). In this manner, as each of the first and second helical tubes 102, 104 are rotated, the respective first and second portions 20a, 20b of the solar array 20 are drawn closer together or forced further apart, depending upon the direction in which the first and second helical tubes 102, 104 are rotated, as will be described in further detail hereinbelow. As can be appreciated, rather than engaging the first threaded end cap 106, the second helical tube 104 selectively or fixedly engages the second threaded end cap 108 in a similar manner to how the first helical tube 102 engages the first threaded end cap 106 described hereinabove.

The first threaded end cap 106 defines a generally square profile defining a threaded bore (not shown) through opposed side surfaces thereof that is configured to threadably engage a power screw 144 of the power screw driver assembly 120, as will be described in further detail hereinbelow. The first threaded end cap 106 is configured to be selectively or fixedly coupled to second end portion 102b of the first helical tube 102, such that rotation of the first end cap 106 effectuates a corresponding rotation of the first helical tube 102. The second threaded end cap 108 is substantially similar to the first threaded end cap 106 except that the threaded bore of the second threaded end cap is threaded in an opposite direction to the threaded bore of the first threaded end cap (e.g., the threaded bore of the first threaded end cap 106 is a right hand thread whereas the threaded bore of the second threaded end cap 108 is a left hand thread, or vice versa) and the second threaded end cap 108 is configured to selectively or fixedly engage the second helical tube 104.

The support structure 110 is interposed between bases of the plurality of bases 50 disposed at a respective end of the first and second portions 20a, 20b of the solar array 20 (FIG. 8) and includes a horizontal beam 112 and a vertical beam 114 disposed on an upper portion of the horizontal beam 112 and extending therefrom. Although generally illustrated as being I-beams, it is contemplated that the horizontal beam 112 and the vertical beam 114 may be any suitable beam, such as a C-channel, box tube, circular tube, etc. In embodiments, the horizontal beam 112 and the vertical beam 114 may be the same type of beam or different beams. The horizontal beam 112 is selectively or fixedly coupled to each of the bases of the plurality of bases 50 using any suitable means, and in one non-limiting embodiment is coupled to the bases 50 by shear plates. The vertical beam 114 is selectively or fixedly coupled to the horizontal beam 112 using any suitable means, and in one non-limiting embodiment is coupled to the horizontal beam 112 by shear plates.

Figure 6:
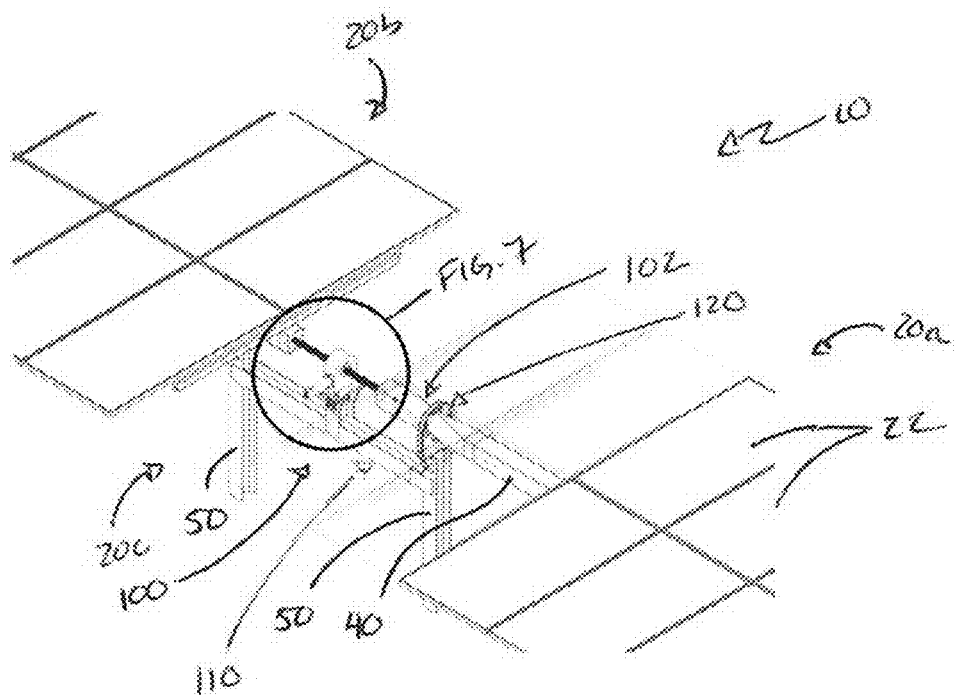
FIG. 6 is a top, perspective view of the solar tracking system of FIG. 1 showing the articulation system of FIG. 5 and with a solar module of the solar tracking system shown in phantom.
Figure 7:
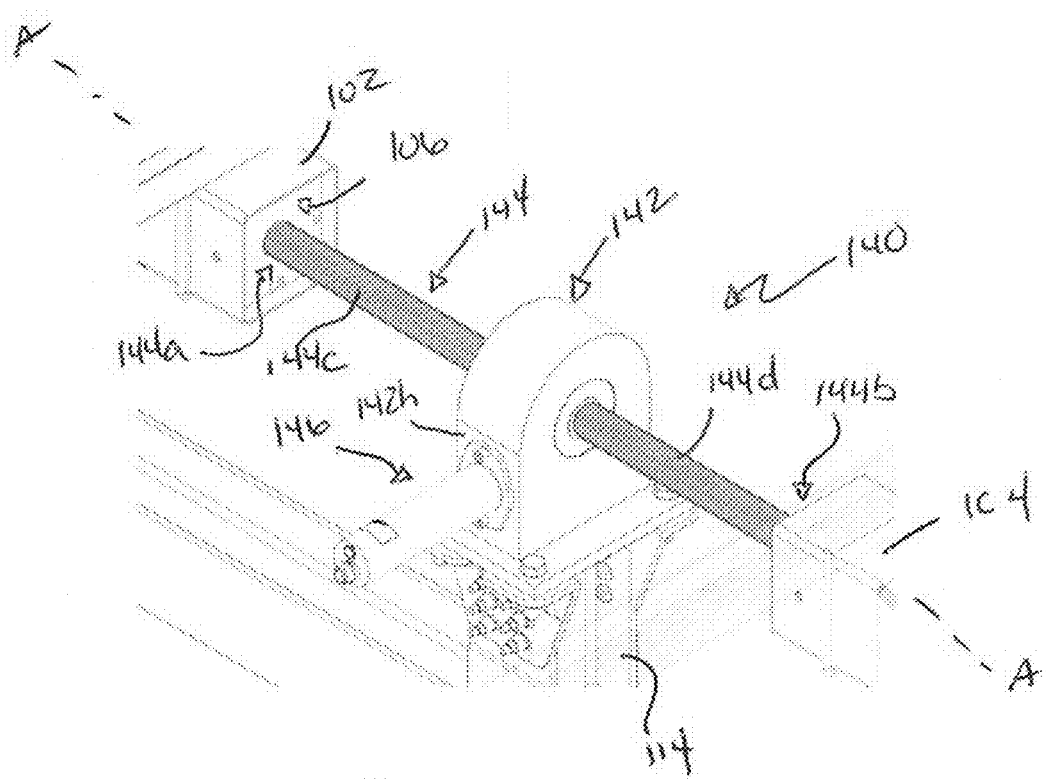
FIG. 7 is an enlarged view of the area of detail indicated in FIG. 6.
Figure 8:
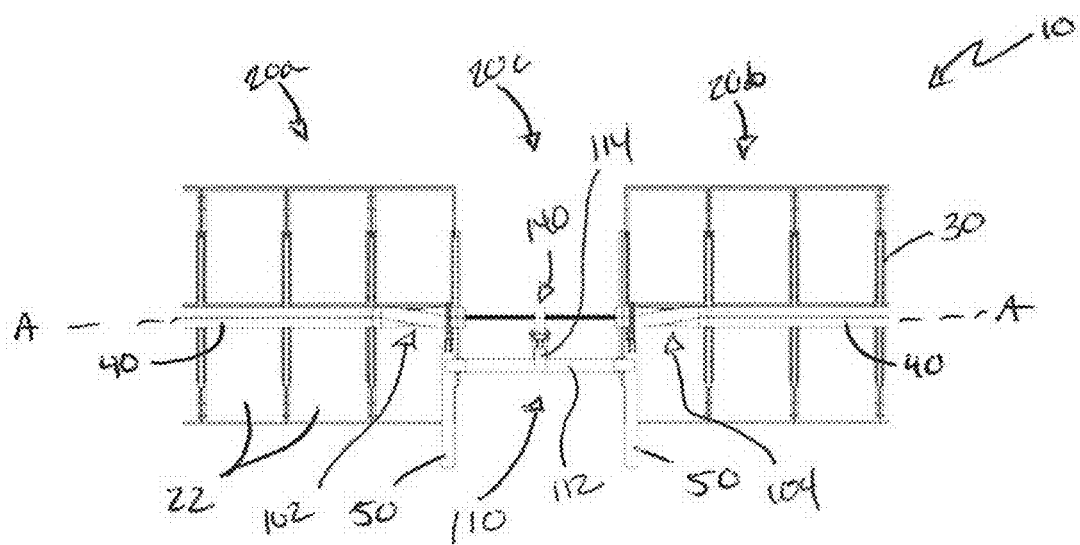
FIG. 8 is a side view of the solar tracking system of FIG. 1 showing the articulation system of FIG. 5 in an extended position.
Figure 9:
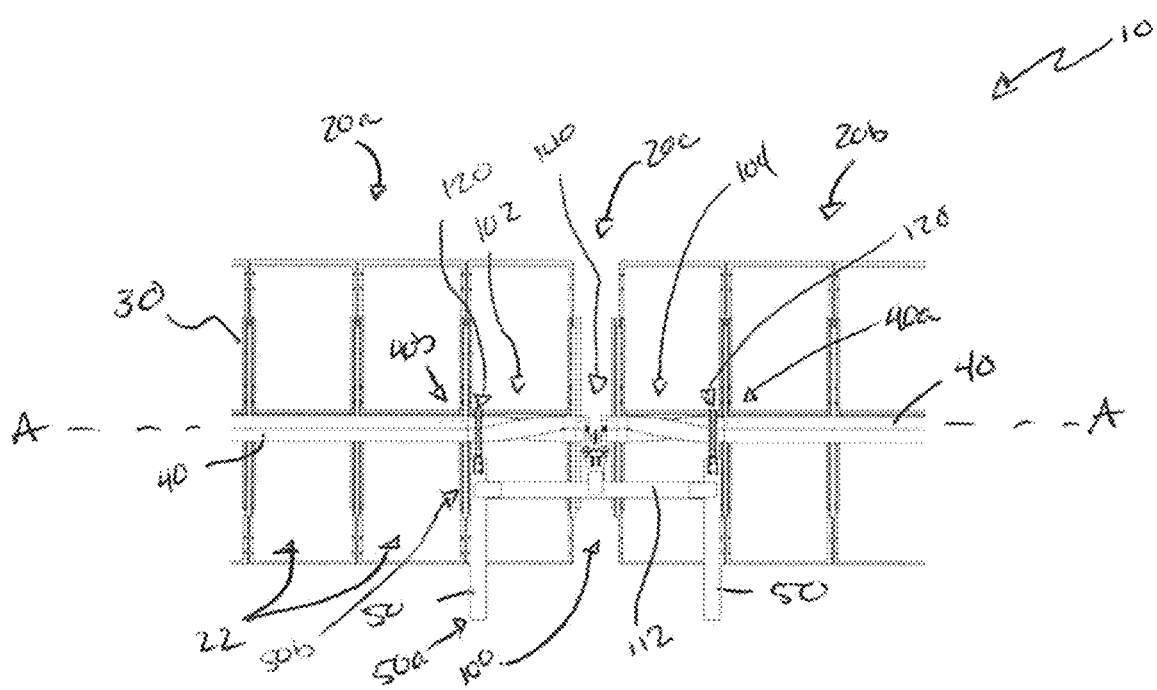
FIG. 9 is a rear view of the solar tracking system of FIG. 1 showing the articulation system of FIG. 5 in a retracted position.

With additional reference to FIGS. 13-16, the support structure 110 includes a plurality of helical tube supports 120 supported on the second end portion 50b of each base of the plurality of bases 50 that is disposed at a respective end of the first and second portions 20a, 20b of the solar array 20 (FIGS. 6 and 8). Each helical tube support of the plurality of helical tube supports 120 is substantially similar, and thus, only one helical tube support 120 will be described herein in the interest of brevity.

The helical tube support 120 defines a generally triangular profile extending between opposed end surfaces 120a and 120b, although it is contemplated that the helical tube support 120 may include any suitable profile, such a circular, square, rectangular, oval, etc. It is contemplated that the helical tube support 120 may be selectively or fixedly coupled to the second end portion 50b of a respective base of the plurality of bases 50 using any suitable means, such as flanges, base-plates, mechanical fasteners, friction fit, adhesives, welding, etc. In embodiments, the helical tube support 120 may be formed from any material suitable for use outdoors and may be formed using any suitable process.

The opposed end surfaces 120a, 120b define a through-hole 122 that is configured to slidably receive a portion of a respective helical tube of the first and second helical tubes 102, 104. Although generally illustrated as having a square profile, it is contemplated that the profile of the through-hole 122 may be any suitable profile corresponding to the profile of the first or second helical tube 102, 104 that is received therein. As can be appreciated, as the first and second helical tubes 102, 104 include a generally square profile, the through-hole 122 of the helical tube support 120 will have a corresponding square profile.

Figure 13:
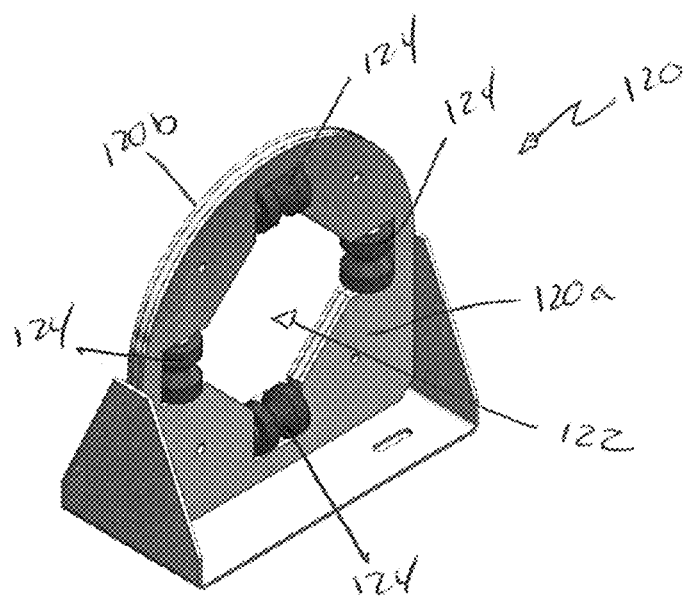
FIG. 13 is a perspective view of a helical tube support of the solar tracking system of FIG. 11.
Figure 14:
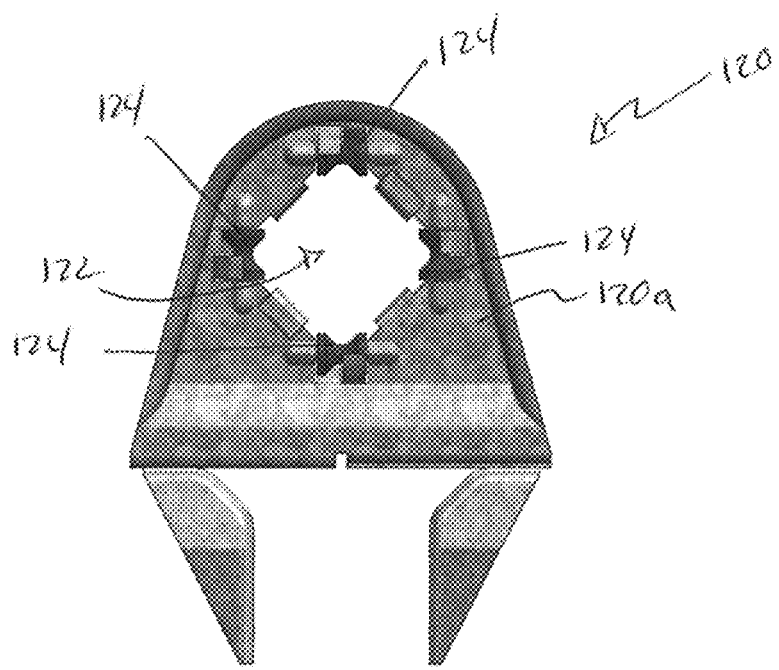
FIG. 14 is a side view of the helical tube support of FIG. 13.

As illustrated in FIGS. 13 and 14, a plurality of rollers 124 is disposed in each corner defined by the square shaped profile of the through-hole 122. Although generally illustrated as having a V-shaped profile, it is contemplated that the plurality of rollers 124 may include any suitable profile capable of retaining a corresponding corner of a helical tube 102, 104 therein, such as U-shaped, C-shaped, etc. The plurality of rollers 124 is configured to slidably support the helical portion 102e or 104e of the first or second helical tube 102, 104 such that as the helical portion 102e, 104e is axially translated within the through-hole 122 along the axis A-A, the plurality of rollers 124 impart a force thereon to cause the helical tube 102, 104 to rotate about the axis A-A. It is contemplated that the plurality of rollers 124 may be any suitable device capable of rotatably supporting the helical tube 102, 104 and may be formed as a single body or from multiple portions. It is envisioned that the plurality of rollers 124 may be formed from any material suitable for use outdoors, such as steel (galvanized, stainless), polymers, ceramics, composites, etc. As can be appreciated, the profile of the through-hole 122 may be any suitable profile, such as triangular, pentagonal hexagonal, octagonal, etc. such that each corner or apex of the profile of the through-hole includes a corresponding roller of the plurality of rollers 124, depending upon the profile of the helical tube 102, 104.

Figure 15:
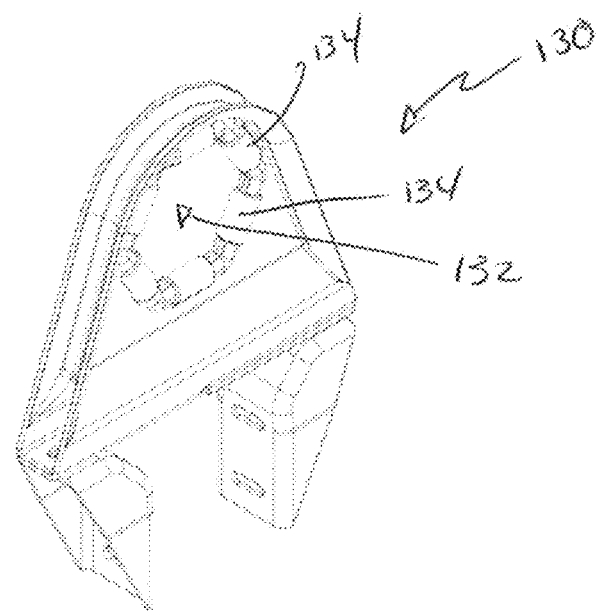
FIG. 15 is a perspective view of another helical tube support provided in accordance with the present disclosure.
Figure 16:
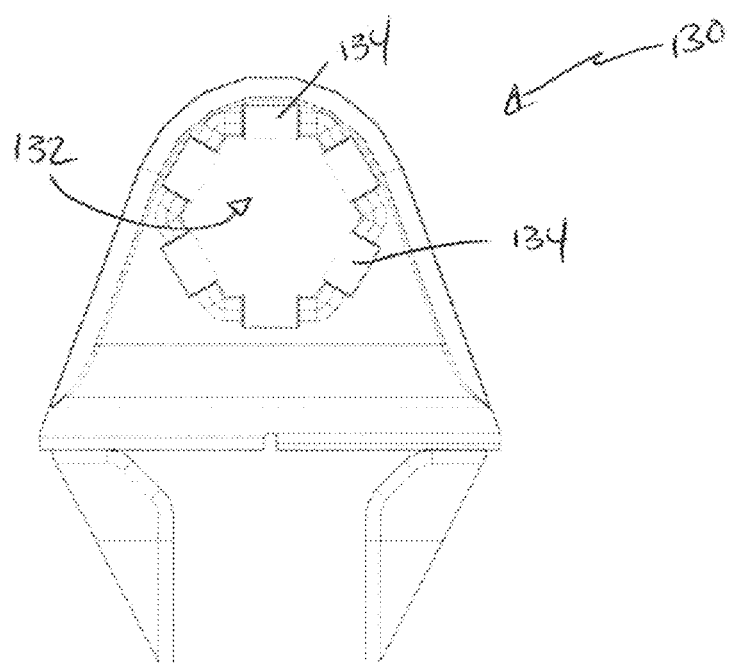
FIG. 16 is a side view of the helical tube support of FIG. 15.
Figure 17:
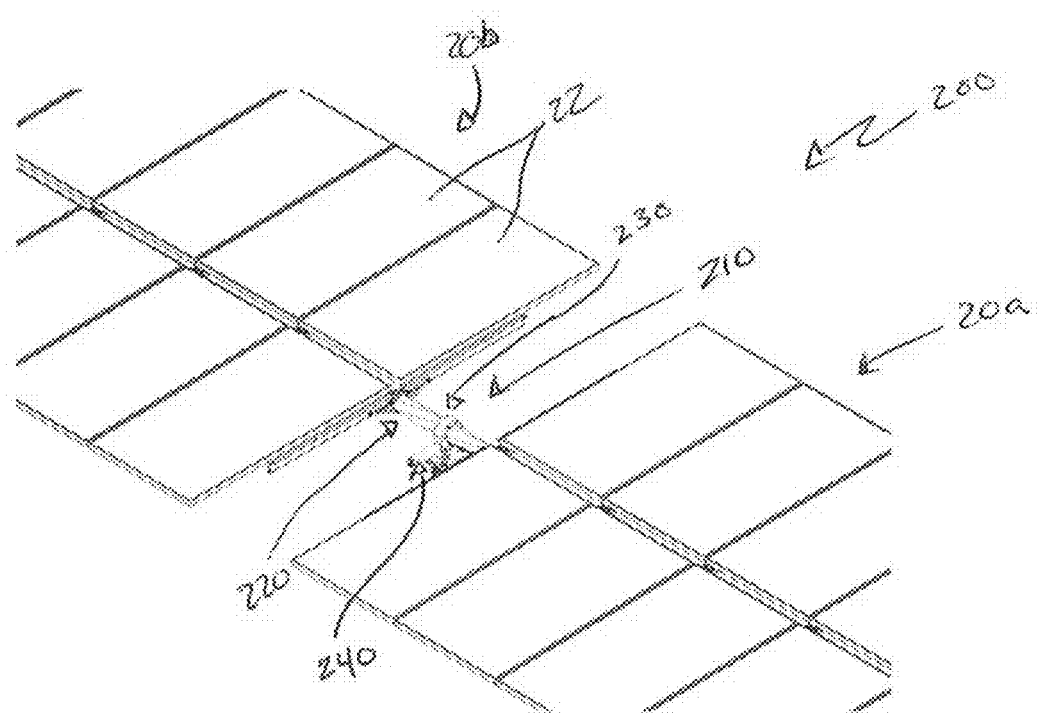
FIG. 17 is a top, perspective view of an alternate embodiment of a solar tracking system provided in accordance with the present disclosure illustrating an alternate embodiment of an the articulation system, shown in an extended position.
Figure 18:
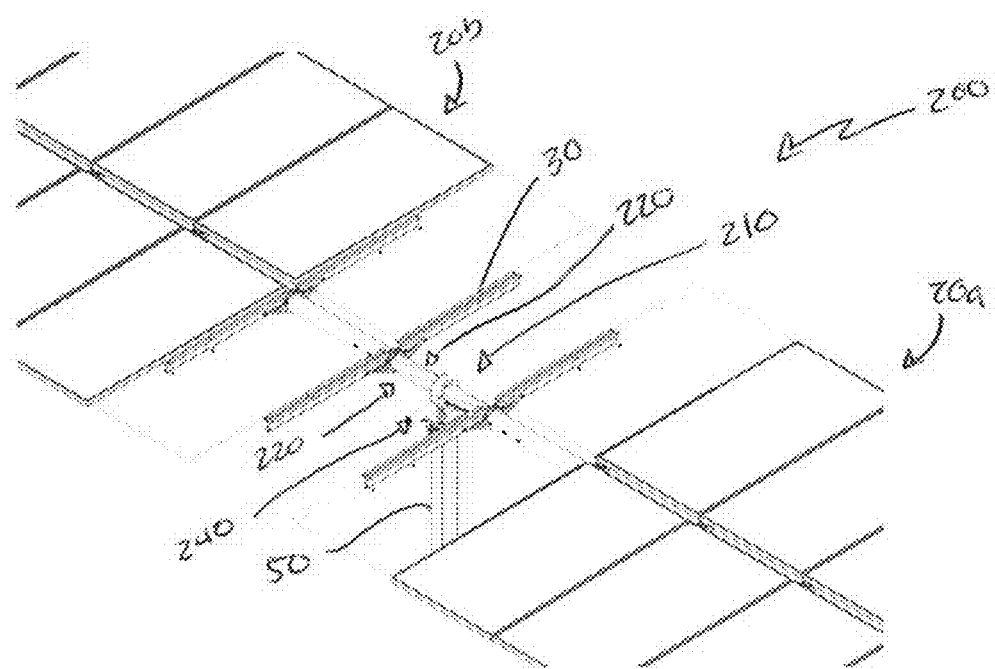
FIG. 18 is a top, perspective view of the solar tracking system of FIG. 17 illustrating the articulation system of FIG. 17 and with solar modules of the solar tracking system shown in phantom.
Figure 19:
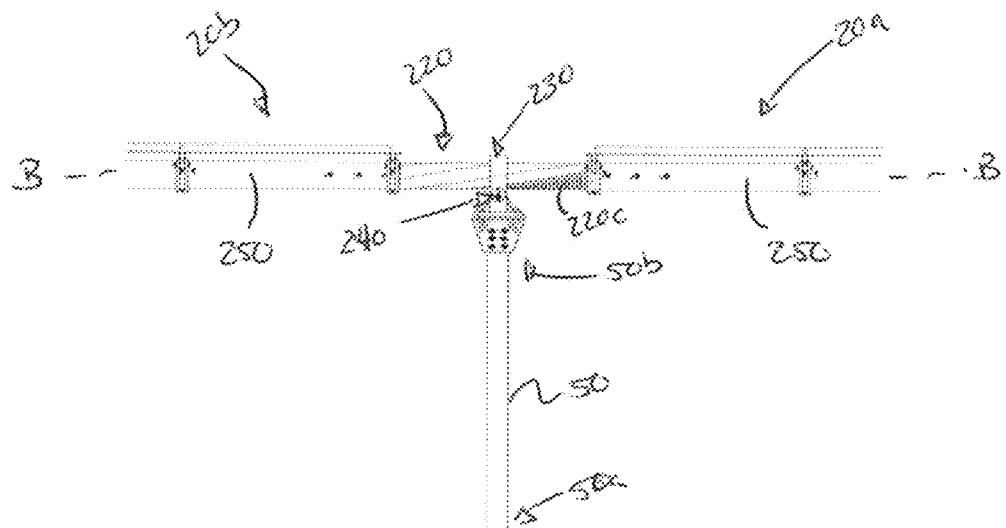
FIG. 19 is a side view of the solar tracking system of FIG. 17 showing the articulation system of FIG. 17.
Figure 20:
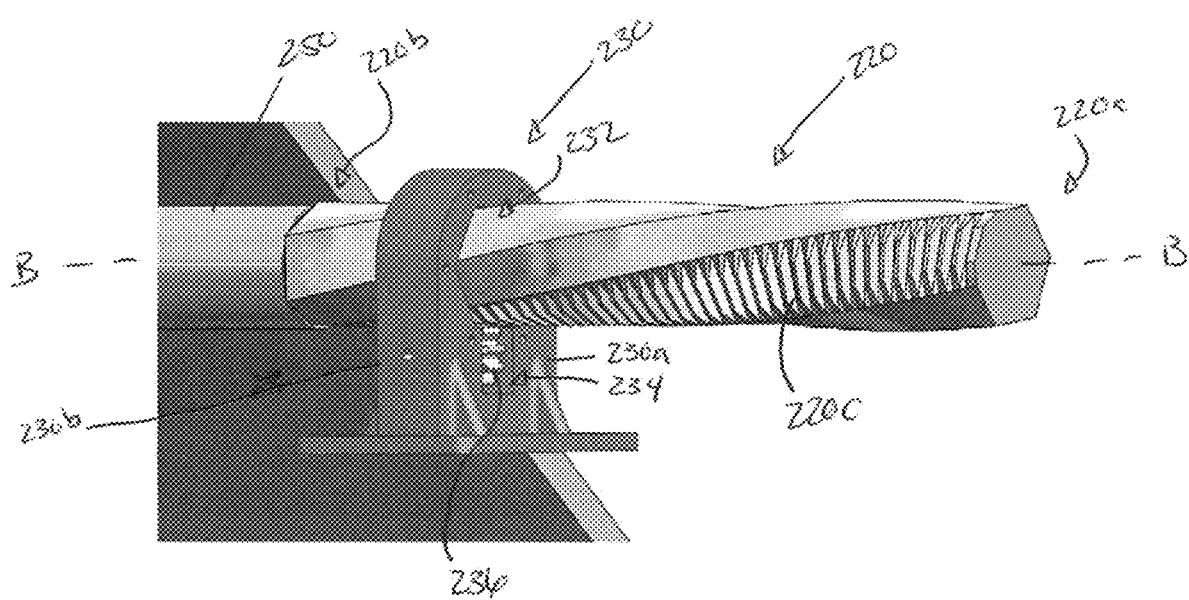
FIG. 20 is a perspective view of the articulation system of FIG. 17.
Figures 21A, 21B:
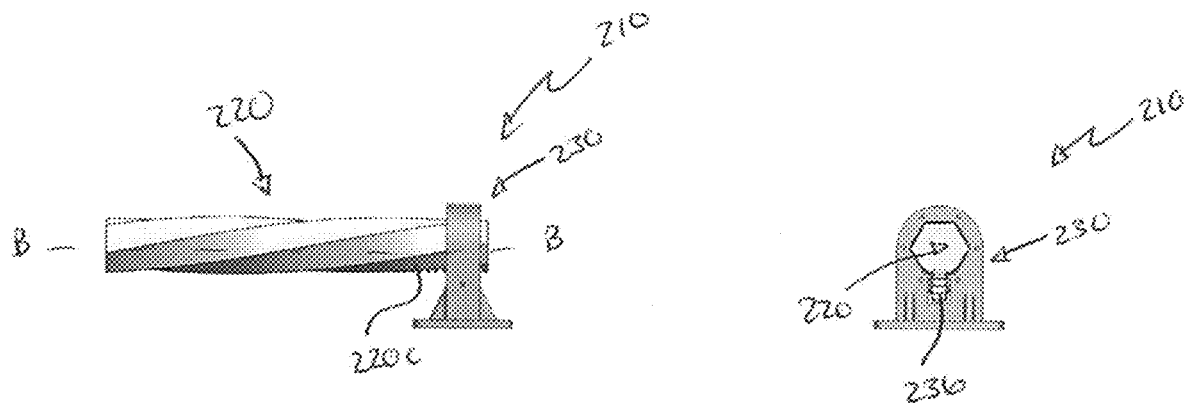
FIG. 21A is a front view of the articulation system of FIG. 17, shown in an initial position.
FIG. 21B is a side view of the articulation system of FIG. 17, shown in an initial position.
Figures 22A, 22B:
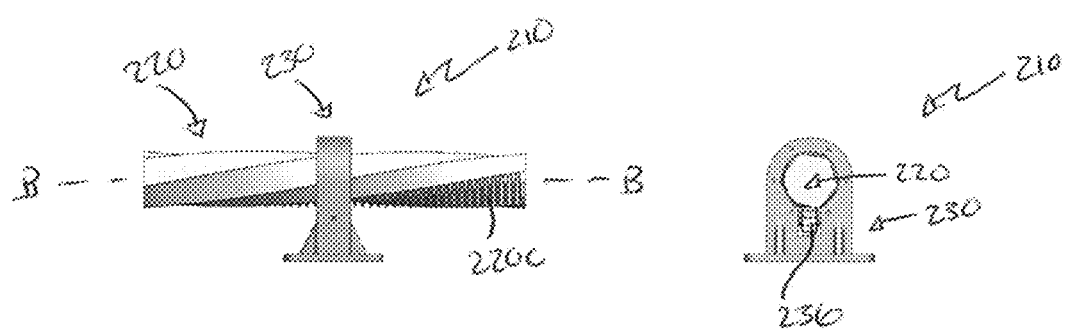
FIG. 22A is a front view of the articulation system of FIG. 17, shown in a partially actuated position.
FIG. 22B, is a side view of the articulation system of FIG. 17, shown in a partially actuated position.

FIGS. 15 and 16 illustrate an alternate embodiment of the helical tube support that is provided in accordance with the present disclosure and generally identified by reference numeral 130. The helical tube support 130 is substantially similar to the helical tube support 120, therefore, only the differences therebetween will be described in detail in the interest of brevity.

The through-hole 132 defines a substantially hexagonal profile and includes a roller bushing or bearing 134 rotatably supported thereon that is configured to slidably support the first or second helical tube 102, 104 that is received therein. In this manner, each roller bushing 134 maintains contact with the helical portion 102e or 104e of the first or second helical tube 102, 104, such that as the helical portion 102e or 104e is axially translated along the axis A-A therein, the roller bushings 134 impart a force thereon to cause the helical tube to rotate about the axis A-A. It is contemplated that the roller bushing 134 may be any suitable device capable of slidably supporting the helical tubes 102, 104 such as a metal bushing, a bearing, a polymeric bushing, etc. and may be coupled to each face of the through-hole 132 using any suitable means.

It is envisioned that each roller bushing 134 or certain roller bushings 134 may include a biasing element (e.g., compression spring, polymeric spring, Bellville washer(s), gas spring, etc.) to bias the roller bushing 134 into contact with the helical portion 102e or 104e of the first or second helical tube 102, 104 such that constant contact may be maintained between roller bushings 134 and the helical portion 102e or 104e. As can be appreciated, maintaining contact between the roller bushings 134 and the helical portion 102e or 104e aids in eliminating or reducing backlash as the helical portion 102e or 104e is translated within the through-hole 132 and increases the accuracy of locating the orientation of the solar array 20 relative to the position of the sun.

The power screw driver assembly 140 is supported by the vertical beam 114 and includes a gearbox 142, a power screw 144, and a motor 146. The gearbox 142 includes a housing 142a having a through-bore 142b (FIG. 12) defined through opposing side surfaces 142c and 142d thereof. The through-bore 142b is configured to rotatably retain a portion of the power screw 144 therein, as will be described in further detail hereinbelow. A side surface 142h of the gearbox 142 defines a transverse bore 142i therethrough that is in open communication with the through-bore 142b. The gearbox 142 is selectively or fixedly secured to the vertical beam 114 of the support structure 110 using any suitable means, such as brackets, welding, adhesives, etc.

The power screw 144 extends between a first end portion 144a and an second, opposite end portion 144b and defines a first threaded outer surface 144c adjacent the first end portion 144a and a second threaded outer surface 144d adjacent the second end portion 144b. The first and second threaded outer surfaces 144c, 144d are separated by an unthreaded or incomplete threaded center portion interposed therebetween. Each of the first and second threaded outer surfaces 144c, 144d defines a different thread direction (e.g., opposite one another), such that the first threaded outer surface 144c may define a right hand thread whereas the second threaded outer surface 144d may define a left hand thread, or vice versa. As can be appreciated, each of the first and second outer surfaces 144c, 144d define a thread direction that is complementary to the thread direction of respective threaded bores 106b, 108b of the first and second threaded end caps 106, 108 such that the power screw 144 may threadably engage the threaded bores 106b, 108b. In this manner, as the power screw 144 is rotated in a first direction, the first and second threaded end caps 106, 108 are drawn towards one another to reduce the gap 20c defined between the first and second portions 20a, 20b of the solar array 20 and as the power screw 124 is rotated in a second, opposite direction, the first and second threaded end caps 106, 108 are pushed away from one another to increase the gap 20c. As will be described in further detail hereinbelow, the axial translation of the first and second portions 20a, 20b of the solar array 20 causes the first and second portions 20a, 20b to rotate relative to each base of the plurality of bases 50 to track the location of the sun.

The first and second threaded outer surfaces 144c, 144d of the power screw 144 may define any suitable threadform (e.g., square, trapezoidal, buttress, etc.) capable of supporting and transmitting large loads, although other threadforms are also contemplated, such as triangular threadforms (e.g., uniform thread standard, etc.). In embodiments, the power screw 144 may be a ball screw, a glidescrew, a leadscrew, etc. In one non-limiting embodiment, the first and second threaded outer surfaces 144c, 144d of the power screw 144 define a trapezoidal threadform such as an acme threadform and may have self-locking or anti-backdrive properties sufficient to inhibit the power screw 144 from rotating under the static weight of the solar array 20 and the support beams 30 (e.g., the static weight of the solar array 20 and the support beams 30 applies a torque to the torque tube 40, which in turn, applies a torque to the first and second helical tubes 102, 104 which may generate an axial force upon the power screw 144). Additionally, the anti-backdrive properties of the power screw 124 inhibit the power screw 144 from rotating when an external force is applied to the solar tracking system 10, such as wind, snow, wildlife, etc.

Figure 12:
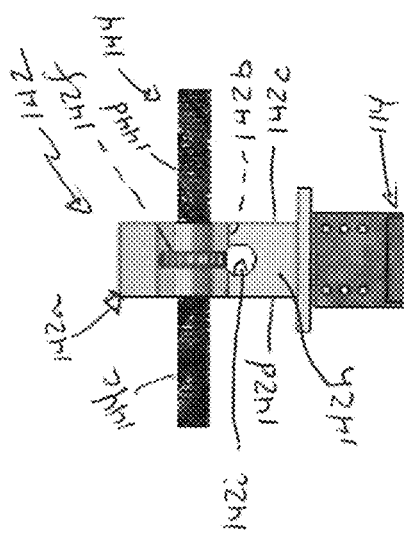
FIG. 12 is an enlarged view of the area of detail indicated in FIG. 11.

It is contemplated that the power screw 144 may be monolithically formed (e.g., one piece), such as a twin-lead screw, or may be formed from two or more components, such as a right hand power screw and a left hand power screw joined by an unthreaded spacer using friction fit, welding, adhesives, etc. or a right hand power screw and a left hand power screw rotatably and translatably supported within a housing, which in turn, is rotatably and translatably supported within the through-bore 142b of the gearbox 142 (FIG. 12).

Continuing with FIG. 12, the gearbox 142 includes a spur gear 142f that is supported on the center portion of the power screw 144 and is inhibited from rotating relative to the power screw 144 using any suitable means, such as keys, friction fit, adhesives, welding, clamps, etc. A motor 146 (FIG. 7) is coupled to the side surface 142h of the gearbox 142 and includes a driveshaft (not shown) that is received within the transverse bore 142i. A worm gear (not shown) is supported on the driveshaft and engages the spur gear 142f such that worm gear transmits rotational motion from the driveshaft of the motor 146 to the spur gear 142f and therefore the power screw 144. In embodiments, the spur gear 142f may be an anti-backlash gear to aid in inhibiting backlash existing from the meshing between the spur gear 142f and the worm gear, which may increase the accuracy of locating the orientation of the solar array 20 relative to the position of the sun. Although generally described as being as a gear train, it is contemplated that the gearbox 142 may utilize any suitable means to transmit rotational motion to the power screw 144, such as belts and pulleys, friction wheels, etc.

Returning to FIG. 10, a passive articulation system 160 is illustrated and includes a passive helical tube 162 and a passive helical tube support 164. The passive helical support tube 164 is selectively or fixedly supported on the second end portion 50b of a respective base of the plurality of bases 50. The passive helical tube support 164 is substantially similar to the helical tube supports 120, 130, and thus will not be described in detail herein in the interest of brevity. The passive helical tube 162 is substantially similar to the helical tubes 102, 104, and thus, will not be described in detail in the interest of brevity. The passive helical tube 162 is interposed between adjacent torque tubes 40 and is selectively or fixedly coupled thereto using any suitable means, such as mechanical fasteners, friction fit, adhesives, welding, etc.

The passive helical tube 162 and the passive helical tube support 164 cooperate to cause rotation of each torque tube 40 as the torque tubes 40 are driven in an axial direction along axis A-A by the articulation system 100. Specifically, the passive articulation system 160 aids in articulating the solar array 20 by providing additional locations at which a torque is applied to the torque tubes 40. In this manner, the additional location at which rotational torque is introduced increases the stiffness of the solar array 20 and reduces wind-up or twist of the solar array 20. It is contemplated that a passive articulation system 160 may be disposed at any or all of the bases of the plurality of bases 50, depending upon the installation needs of the solar tracking system 10.

With reference to FIGS. 17-23B another embodiment of a solar tracking system provided in accordance with the present disclosure is illustrated and generally identified by reference numeral 200. The solar tracking system 200 is substantially similar to that of solar tracking system 10 and therefore, only the differences therebetween will be described in detail in the interest of brevity.

The solar tracking system 200 includes an articulation system 210 having a helical tube 220, a gearbox 230, and a motor 240. The helical tube 220 defines a generally hexagonal profile extending between a first end portion 220a and a second, opposite end portion 220b along a longitudinal axis B-B. The helical tube 220 is interposed between adjacent torque tubes 250 and the first and second end portions 220a, 220b of the helical tube 220 are configured to selectively or fixedly couple to a respective torque tube 250 such that rotation of the helical tube 220 effectuates a corresponding rotation of each torque tube 250 coupled thereto. A facet of the helical tube 220 defines a plurality of threads 220c thereon that follows a helical arc wound about the longitudinal axis B-B. The plurality of threads 220c is configured to threadably engage a portion of the gearbox 230 such that the gearbox causes an axial translation of the helical tube along the longitudinal axis B-B, as will be described in further detail hereinbelow.

The gearbox 230 is substantially similar to the gearbox 142 and therefore only the differences therebetween will be described in detail in the interest of brevity. The through-bore 232 defines a generally hexagonal profile that is complimentary to the hexagonal profile of the helical tube 220 and includes a plurality of roller bushings or bearings (not shown) similarly to the roller bushings 134 of the helical tube support 130. In this manner, each roller bushing of the gearbox 230 maintains contact with the helical tube 220, such that as the helical tube 220 is axially translated along the axis B-B therein, the roller bushings impart a force thereon to cause the helical tube 220 to rotate about the axis B-B.

The opposing side surfaces 230a, 230b define a channel 234 therethrough that is in open communication with the through-bore 232. The channel 234 is configured to rotatably support a pinion gear 236 therein that is configured to engage the plurality of threads 220c of the helical tube 220 such that rotation of the pinion gear 236 causes the helical tube 220 to translate along the axis B-B. The motor 240 is selectively or fixedly coupled to a side surface 230c of the gearbox and is in mechanical communication with the pinion gear 236. In embodiments, the pinion gear 236 may be an anti-backlash gear to aid in inhibiting backlash existing from the meshing between the pinion gear 236 and the plurality of threads 220c, which may increase the accuracy of locating the orientation of the solar array 20 relative to the position of the sun.

As can be appreciated, the articulation system 210 enables the gap 20c of the solar tracking system 10 to be eliminated. In this manner, the solar array 20 may be a continuous array that is shifted along the axis B-B by the articulation system 210 to effectuate rotation of the solar array 20 from an initial, east position, to a west position as the sun rises and sets.

Figures 23A, 23B:
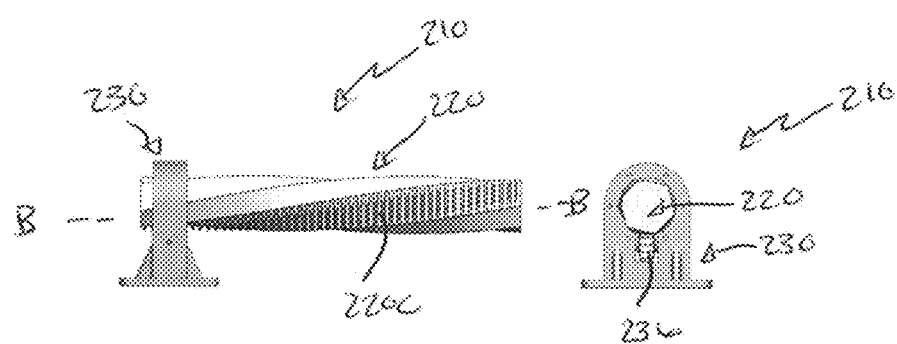
FIG. 23A is a front view of the articulation system of FIG. 17, shown in an actuated position.
FIG. 23B is a side view of the articulation system of FIG. 17, shown in an actuated position.
Figure 24:
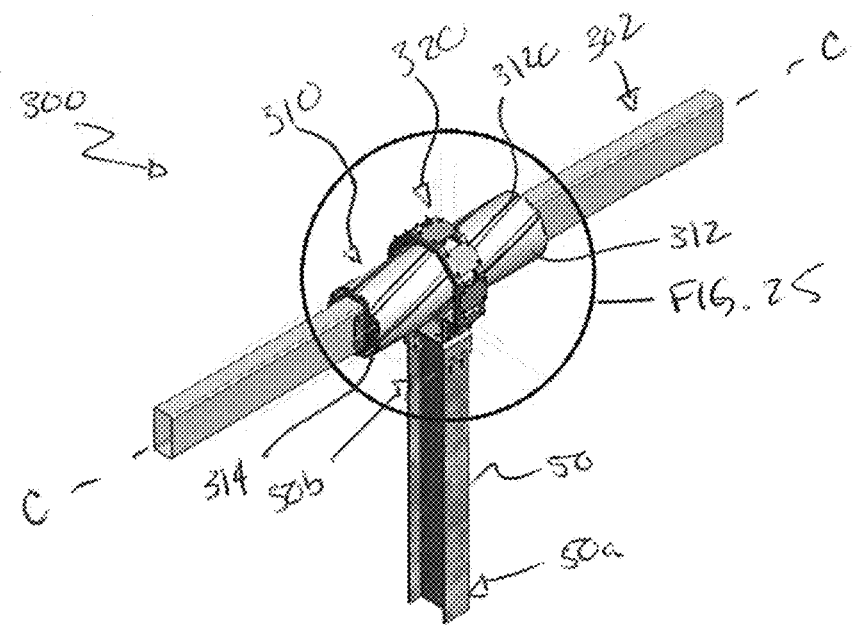
FIG. 24 is a perspective view of yet another embodiment of an articulation system provided in accordance with the present disclosure.
Figure 25:
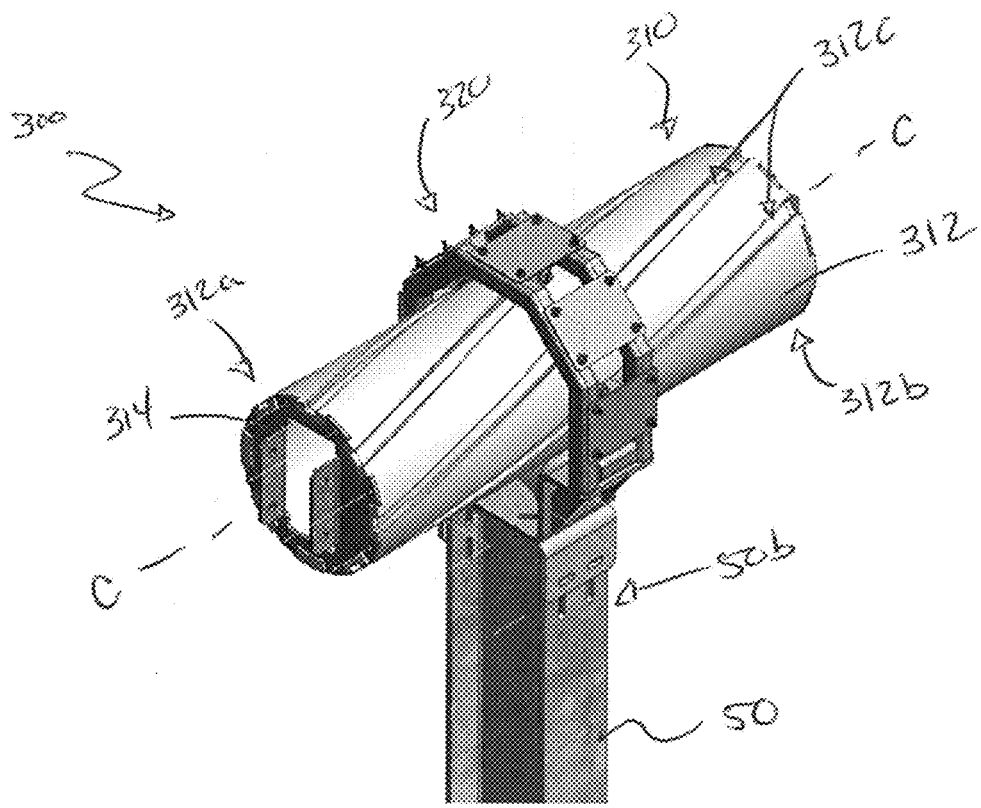
FIG. 25 is an enlarged view of the area of detail indicated in FIG. 24.
Figure 26:
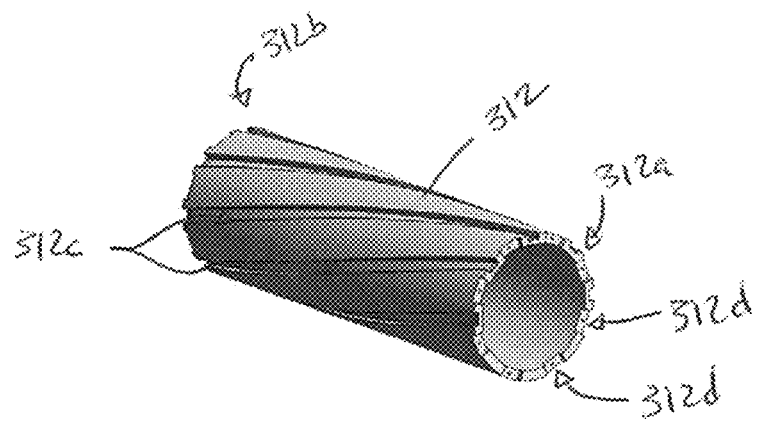
FIG. 26 is a perspective view of a helical tube of the articulation system of FIG. 24.
Figure 27:
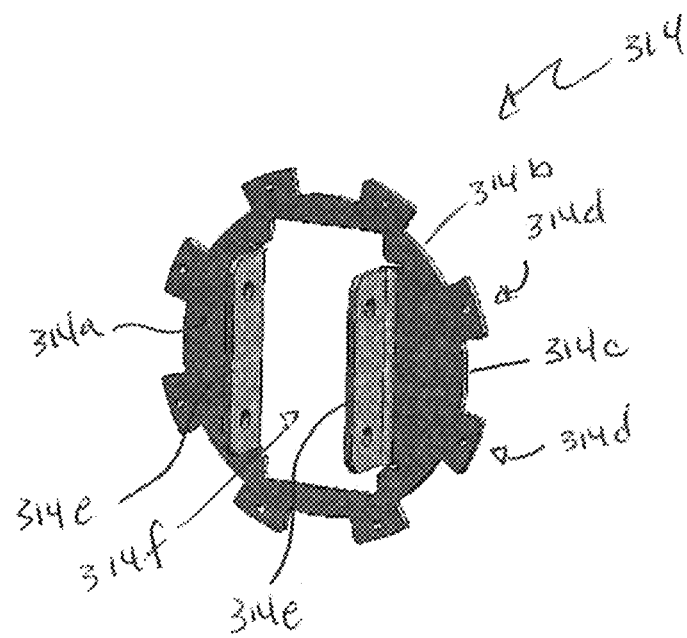
FIG. 27 is a perspective view of an endcap of the articulation system of FIG. 24.
Figure 28:
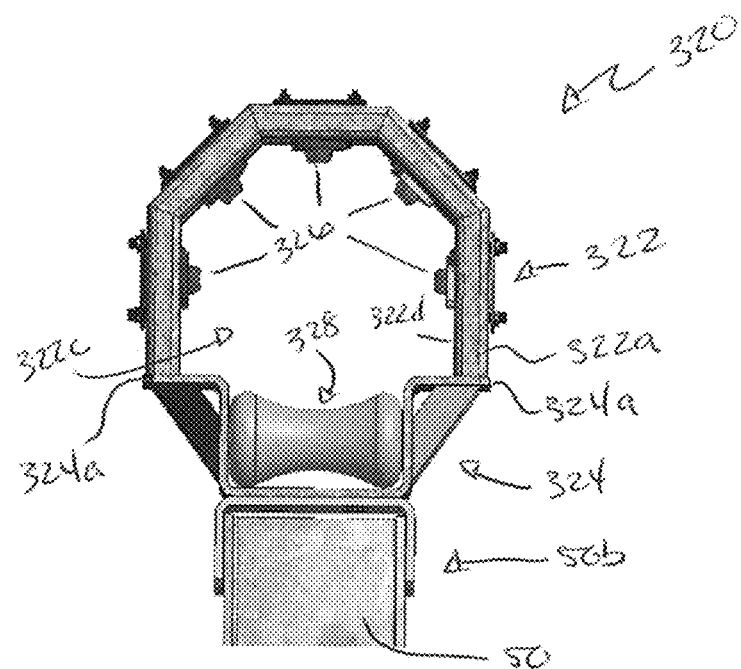
FIG. 28 is a side view of a helical tube support of the articulation system of FIG. 24.
Figure 29:
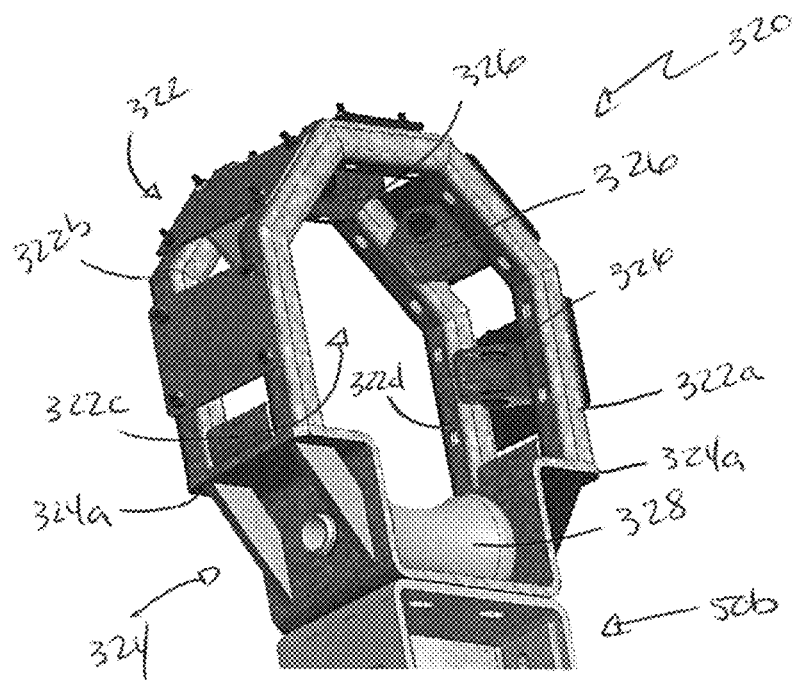
FIG. 29 is a perspective view of the helical tube support of FIG. 28.

With reference to FIGS. 21A-23B, the operation of the articulation system 210 is illustrated. Initially, the helical tube 220 is placed in a left-most position (FIGS. 21A and 21B) such that the second end portion 220b of the helical tube is adjacent the side surface 230b of the gearbox 230, although it is contemplated that the helical tube 220 may be placed in a right-most position. After identifying the position of the sun, a signal is transmitted from a suitable controller (not shown) to the motor or motors 240 to rotate the pinion gear 236 in a first direction and act upon the plurality of threads 220c of the helical tube 220 to drive the helical tube 220 in a first direction along the axis B-B (FIGS. 22A and 22B). Due to the helical configuration of the helical tube 220, the through-bore 232 of the channel and its associated bearings or rollers (not shown, substantially similar to the roller bushings 134 of the helical tube support 130) impart a force upon the helical tube 220 and cause the helical tube 220 to rotate about the axis B-B. As can be appreciated, the rotation of the helical tube 220 causes a corresponding rotation of the torque tubes 250, and therefore causes the solar array to rotate about the plurality of bases 50 to track the location of the sun. As the sun continues to move, the controller sends corresponding signals to the motor to rotate the pinion gear 236 and continue to drive the helical tube 220 in the first direction until the first end portion 220a of the helical tube 220 is adjacent the side surface 230a of the gearbox 230 (FIGS. 23A and 23B). To reset the position of the solar array 20, the signal causes the motor 240 to rotate the pinion gear 236 in a second direction that is opposite to the first direction, thereby driving the helical tube 220 in a second direction that is opposite to the first direction along axis B-B and rotate the solar array back to an east facing orientation.

Turning to FIGS. 24-29, another embodiment of an articulation system is illustrated and generally identified by reference numeral 300. The articulation system 300 includes a torque tube 302, a helical tube assembly 310, and a helical tube support 320. As can be appreciated, the articulation system 300 may be supported on the plurality of bases 50 described in detail hereinbelow using any suitable means.

The torque tube 302 defines a generally rectangular profile extending along a longitudinal axis C-C, although it is contemplated that the torque tube 302 may define any suitable profile capable of transmitting torque from the helical tube assembly 310 to the solar array 20, such as square, oval, hexagonal, hexalobe, etc.

The helical tube assembly 310 includes a helical tube 312 and a pair of end caps 314. The helical tube 312 defines a generally circular profile extending between opposed end surfaces 312a and 312b. An outer surface of the helical tube 312 defines a plurality of channels 312c therein extending between the opposed end surfaces 312a, 312b. Each channel of the plurality of channels 312c is spaced apart from one another and follows a helical arc wound about the longitudinal axis C-C such that the helical tube 312 defines a cylindrical cam or barrel cam configuration. As can be appreciated, the amount of rotation and the pitch of the plurality of channels 312c may vary depending upon the installation needs of the solar tracking system 10. Each of the opposed end surfaces 312a, 312b of the helical tube 312 defines a plurality of slots 312d therein that is configured to receive a corresponding plurality of tabs 314d of the pair of end caps 314 to such that rotation of the helical tube 312 effectuates a corresponding rotation of the pair of end caps 314.

Each end cap of the pair of end caps 314 is substantially similar to one another and thus only one end cap 314 will be described herein in the interest of brevity. The end cap 314 defines a generally circular profile extending between a first end surface 314a and a second, opposite end surface 314b. An outer surface 314c of the end cap 314 defines a plurality of tabs 314d extending radially therefrom which is configured to be received within corresponding slots of the plurality of slots 312d of the helical tube 312. The first end surface 314a of the end cap 314 defines a pair of flanges 314e extending therefrom and spaced apart from one another. The first and second outer surfaces 314a, 314b define a hole 314f therethrough and extending between the pair of flanges 314e and defining a profile that is complementary to the profile of the torque tube 302 such that the torque tube 302 is permitted to be received therein. The pair of flanges 314e is configured to be selectively or fixedly coupled to the torque tube 302 using any suitable means, such as mechanical fasteners, friction fit, adhesives, welding, etc. The pair of tabs 314e and the hole 314f cooperate to rotatably and translatably fix the torque tube 302 to the helical tube 312, such that rotation of the helical tube 312 effectuates a corresponding rotation of the torque tube 302.

The helical tube support 320 includes an upper portion 322, a lower portion 324, a plurality of roller bearings 326, and a lower support bearing 328. The upper portion 322 defines a generally octagonal profile having the lower three facets removed, although any suitable profile is contemplated. Although generally illustrated as being a pair of spaced apart tubes, it is contemplated that the upper portion 322 may be monolithically formed. The upper portion 322 extends between first and second opposed end surfaces 322a, 322b. The first and second opposed end surfaces 322a, 322b define a bore 322c therethrough having a generally octagonal profile. Although generally illustrated as having a profile that is complementary to the profile of the upper portion 322, it is contemplated that the bore 322c may include any suitable profile capable of slidably receiving and supporting the helical tube 312.

The plurality of roller bearings 326 is disposed on an inner surface 322d of the bore 322c and is configured to rotatably and slidably retain the helical tube 312 within the bore 322c. In this manner, each roller bearing of the plurality of roller bearings 326 is configured to be received within a corresponding plurality of channels 312c of the helical tube 312. Accordingly, as the helical tube 312 is translated in an axial direction along the axis C-C, the plurality of roller bearings 326 acts upon the plurality of channels 312c of the helical tube 312 and cause the helical tube 312 to rotate, which as described hereinabove causes the solar array 20 to rotate. In embodiments, the plurality of roller bearings 326 may be oriented parallel to the axis C-C or may be oriented at an angle relative to the axis C-C to accommodate the helical arc of the plurality of channels 312c of the helical tube 312.

The lower portion 324 of the helical tube support 320 defines a generally U-shaped profile having a pair of out-turned flanges 324a. Each flange of the pair of out-turned flanges 324a is configured to be selectively or fixedly coupled to a portion of the upper portion 322 such that the bore 322c of the upper portion is fully enclosed. As can be appreciated, it is envisioned that the pair of out-turned flanges 324a may be coupled to the upper portion 322 using any suitable means, such as mechanical fasteners, adhesives, welding, etc. The lower portion 324 of the helical tube support is selectively or fixedly coupled to the second end portion 50b of a respective base of the plurality of bases 50 using any suitable means, such as flanges, base-plates, mechanical fasteners, friction fit, adhesives, welding, etc.

The lower support bearing 328 is rotatably supported within a portion of the U-shaped profile and defines a generally hour-glass profile to accommodate the circular profile of the helical tube 312, although it is contemplated that any suitable profile may be utilized such a cylinder, etc. The lower support bearing 328 is oriented transverse to the axis C-C (FIG. 25), such that the lower support bearing provides vertical support for the helical tube 312. Although generally referred to as being a bearing, it is contemplated that the lower support bearing 328 may be any suitable device capable of rotatably supporting the helical tube 312, such as a bushing, or the like and may be formed from any material suitable for use outdoors, such as steel (galvanized, stainless, etc.), a polymer, a composite, a ceramic, etc.

Figure 30:
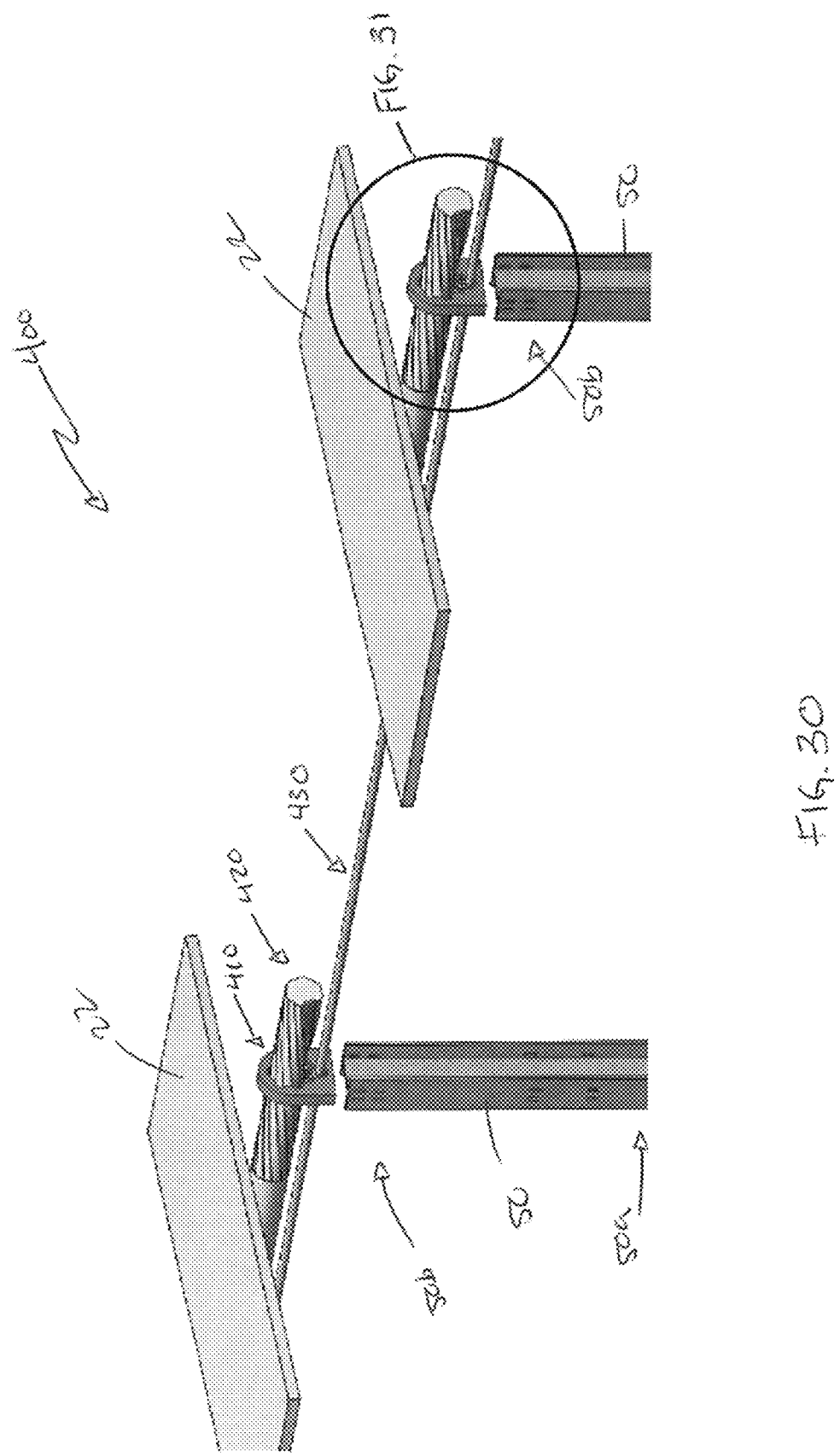
FIG. 30 is a perspective view of still another embodiment of an articulation system provided in accordance with the present disclosure.
Figure 31:
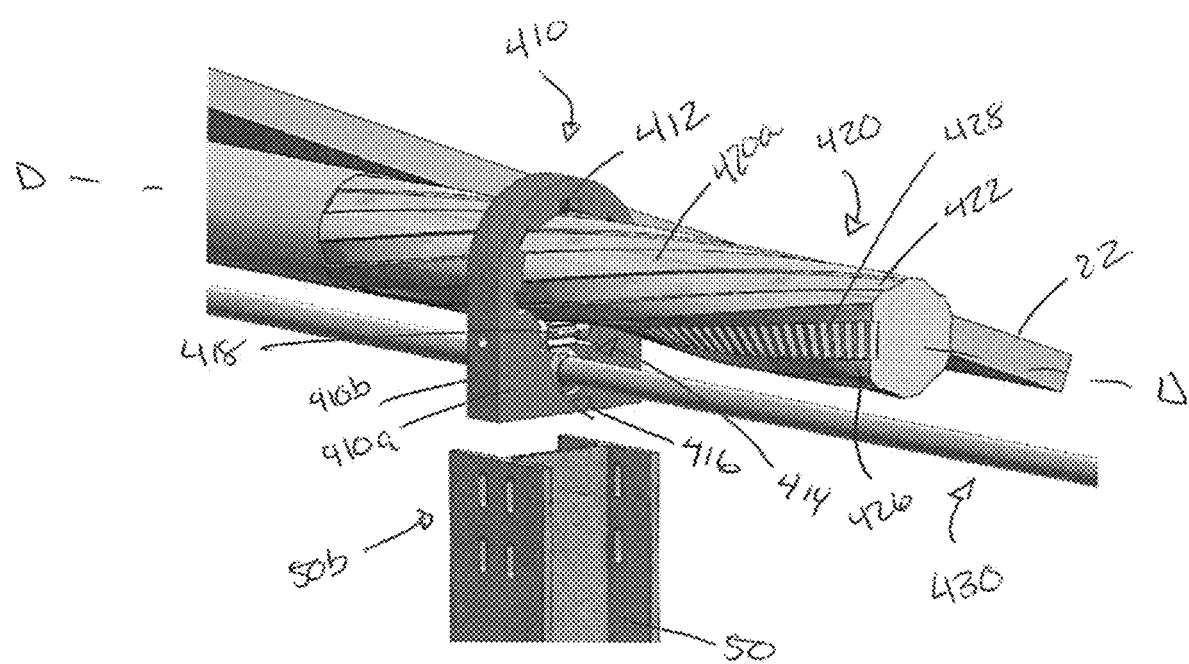
FIG. 31 is an enlarged view of the area of detail indicated in FIG. 30.
Figure 32:
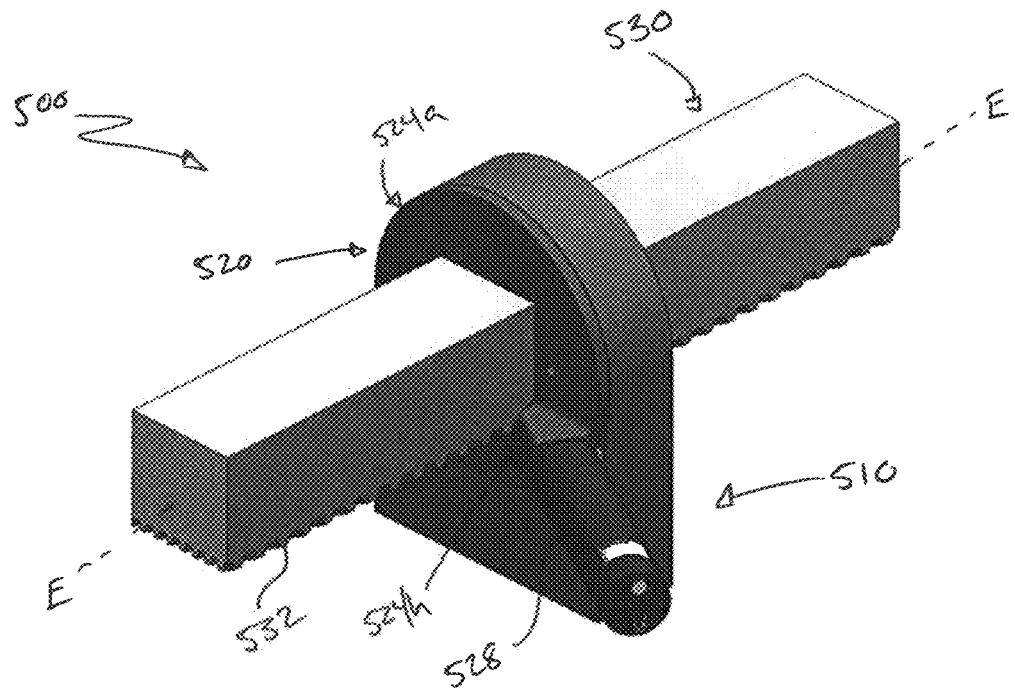
FIG. 32 is a perspective view of another embodiment of an articulation system provided in accordance with the present disclosure.
Figure 33:
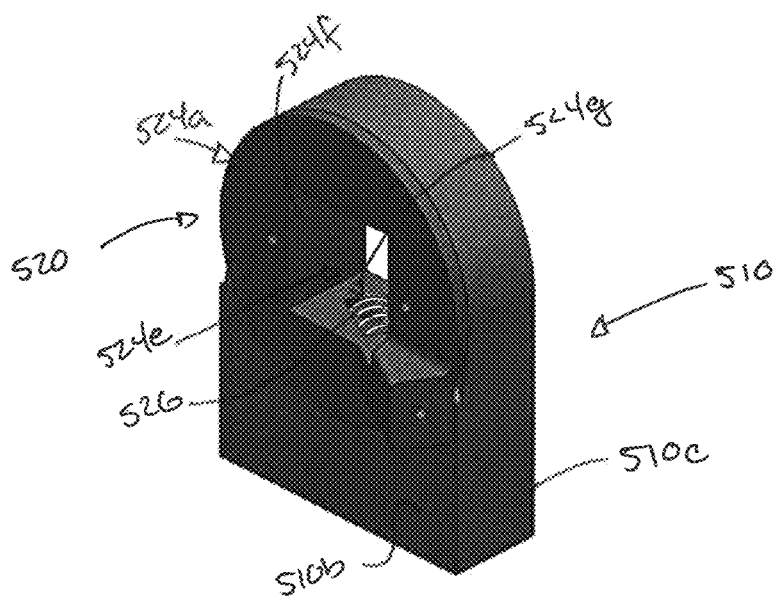
FIG. 33 is a perspective view of the articulation system of FIG. 32 with a torque tube and motor removed.
Figure 34:
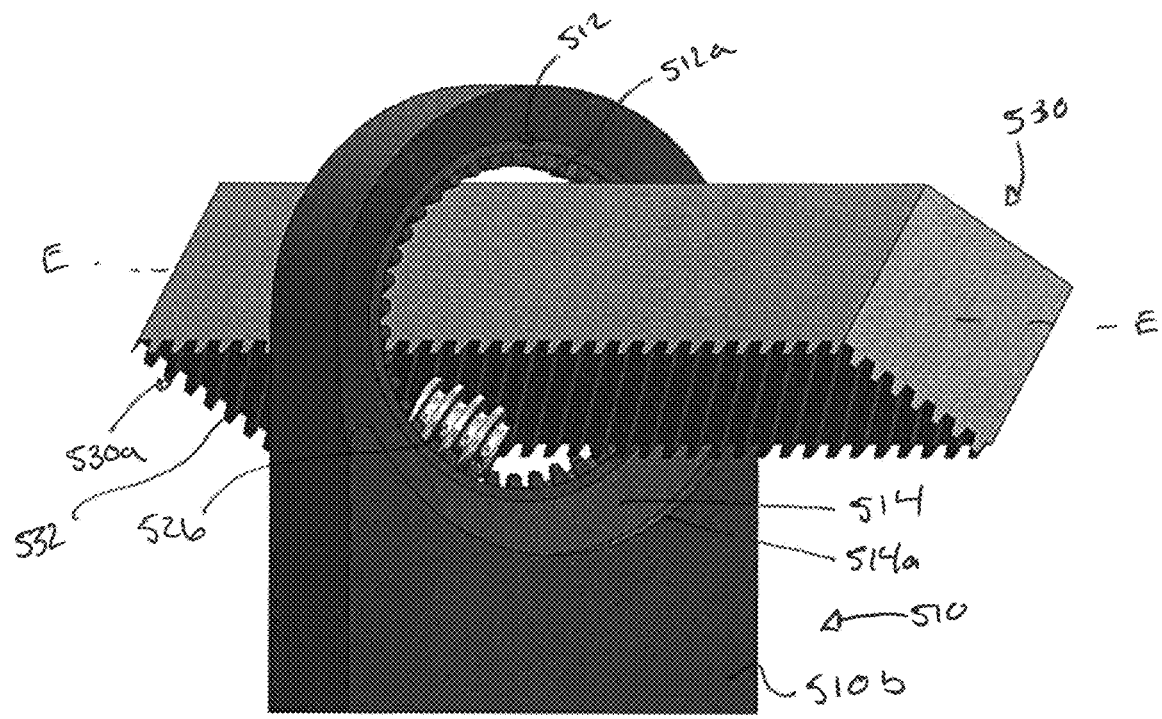
FIG. 34 is a perspective view of the articulation system of FIG. 32 with the torque tube, motor, and a flange assembly removed.

FIGS. 30 and 31 illustrated yet another embodiment of an articulation system provided in accordance with the present disclosure and generally identified by reference numeral 400. The articulation system 400 includes a gearbox 410, a helical tube 420, and a drive shaft 430.

The gearbox 410 is substantially similar to the gearbox 230 (FIGS. 20-23B) except that each bushing of the plurality of bushings 412 (FIG. 31) of the gearbox 410 is configured to be received within a corresponding channel of the plurality of channels 422 defined in the helical tube 420 and the opposed side surfaces 410a, 410b define a slot 416 therethrough that is in open communication with the channel 414. The slot 416 is configured to slidably support the drive shaft 430 therein, as will be described in further detail hereinbelow.

The helical tube 420 is substantially similar to the helical tube 312 except that an outer surface 420a of the helical tube 420 defines a helical relief 422 thereon that follows the arc defined by the plurality of channels 424. The helical relief 426 defines a plurality of threads 428 that is configured to engage a spur gear 418 of the gearbox 410, such that rotation of the spur gear 418 causes translation of the helical tube 420 along the axis D-D.

The drive shaft 430 defines a generally cylindrical profile and extends between respective bases of the plurality of bases 50 such that the drive shaft 430 is received within respective slots 416 of the gearbox 410. An outer surface of the drive shaft 430 defines a plurality of threads (not shown) thereon that is configured to engage the spur gear 418 of the gearbox 410. In this manner, as the driveshaft 430 is driven along the axis D-D using any suitable means (e.g., a motor, etc.), the plurality of threads of the drive shaft 430 cause the spur gear 418 to rotate, which in turn, causes the helical tube 420 to translate along the axis D-D within the gearbox 410. Similarly as described above, axial translation of the helical tube 420 within the gearbox 410 causes the helical tube 420 to rotate about the axis D-D, which in turn causes the solar array 20 to rotate to follow the position of the sun.

Turning now to FIGS. 32-37, still another embodiment of an articulation system is provided in accordance with the present disclosure and generally identified by reference numeral 500. The articulation system 500 includes a housing 510, a gearbox 520, and a torque tube 530. As can be appreciated, the articulation system 500 may be supported on the plurality of bases 50 described in detail hereinabove using any suitable means.

Figure 35:
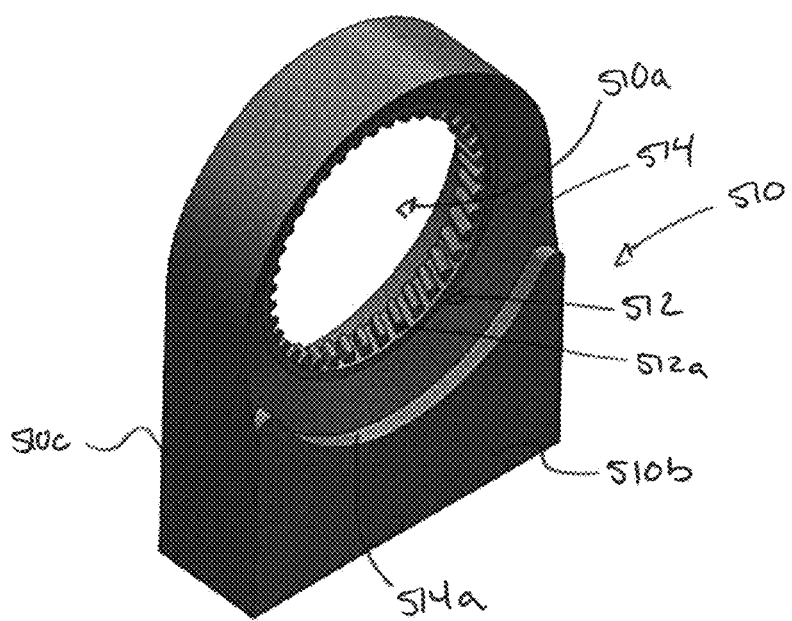
FIG. 35 is a perspective view of a housing of the articulation system of FIG. 32.
Figure 36:
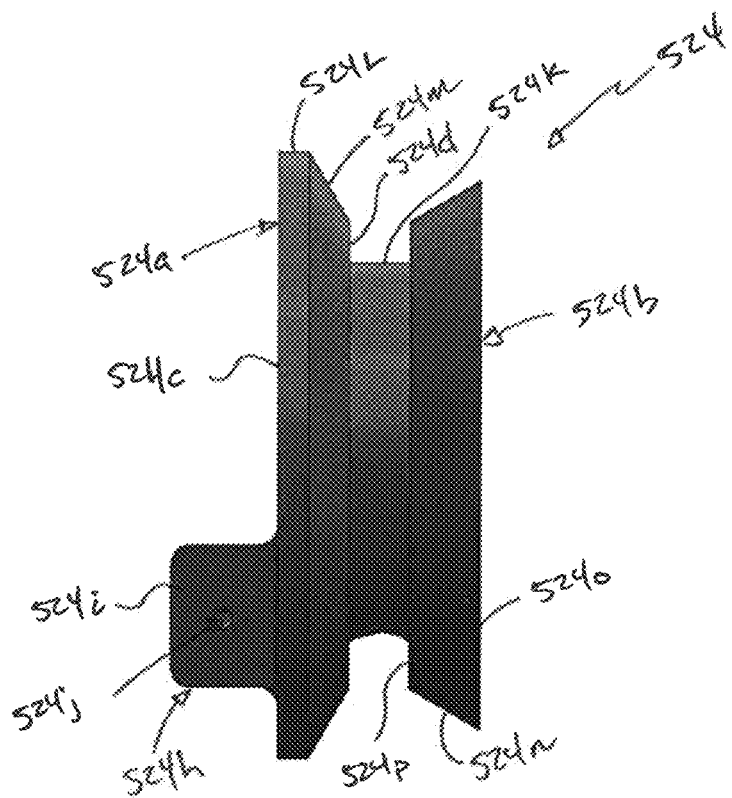
FIG. 36 is a side view of a flange assembly of the articulation system of FIG. 32.
Figure 37:
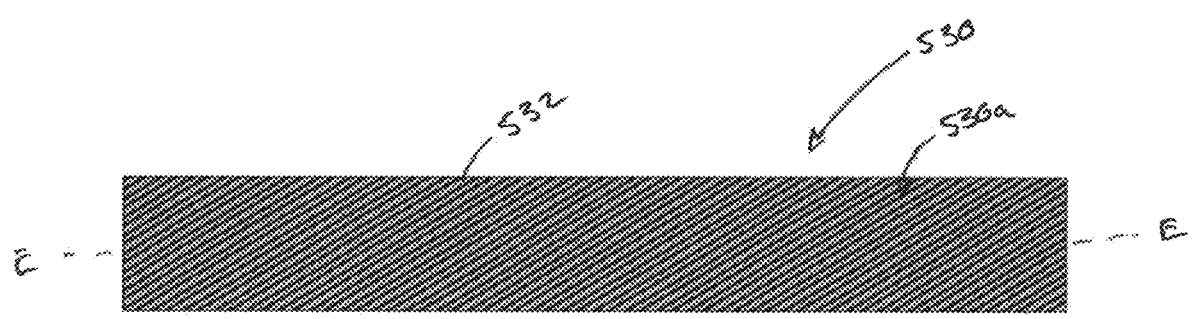
FIG. 37 is a bottom view of a torque tube of the articulation system of FIG. 32.
Figure 38:
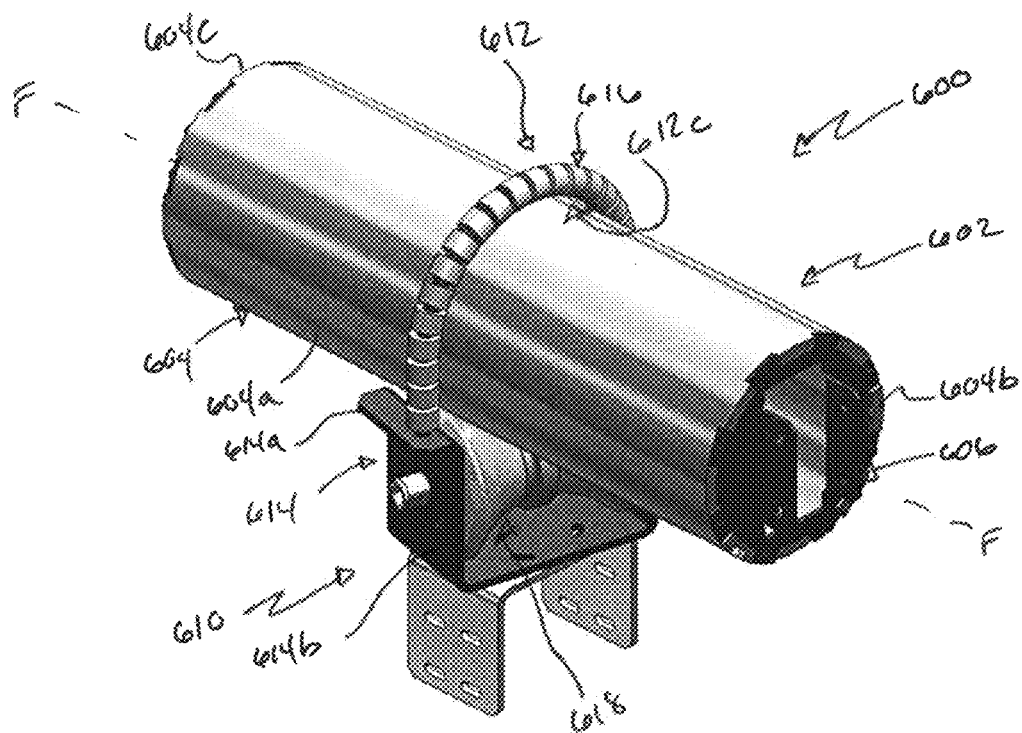
FIG. 38 is a top, perspective view of still another embodiment of an articulation system provided in accordance with the present disclosure.
Figure 39:
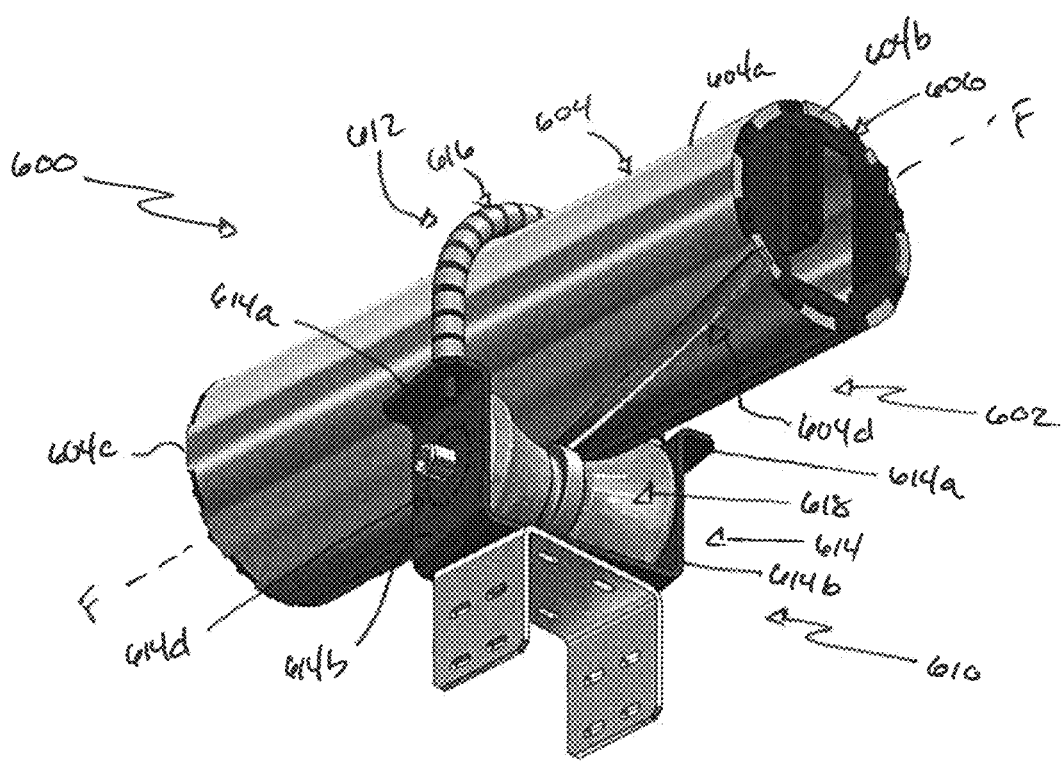
FIG. 39 is a bottom, perspective view of the articulation system of FIG. 38.
Figure 40:
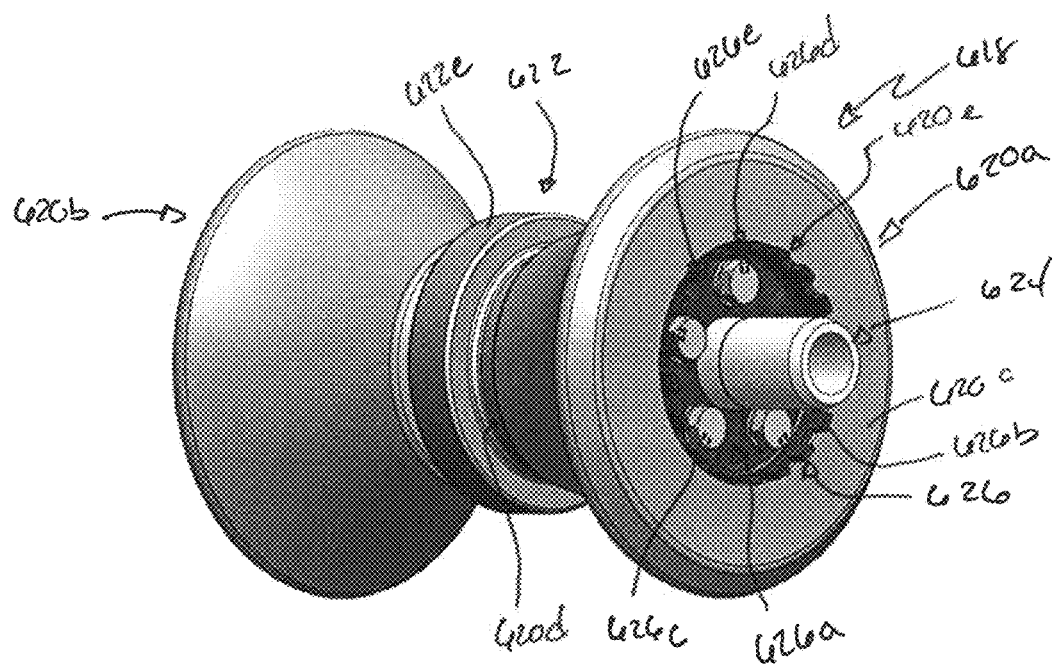
FIG. 40 is a perspective view of a lower support bearing assembly of the articulation system of FIG. 38.
Figure 41:
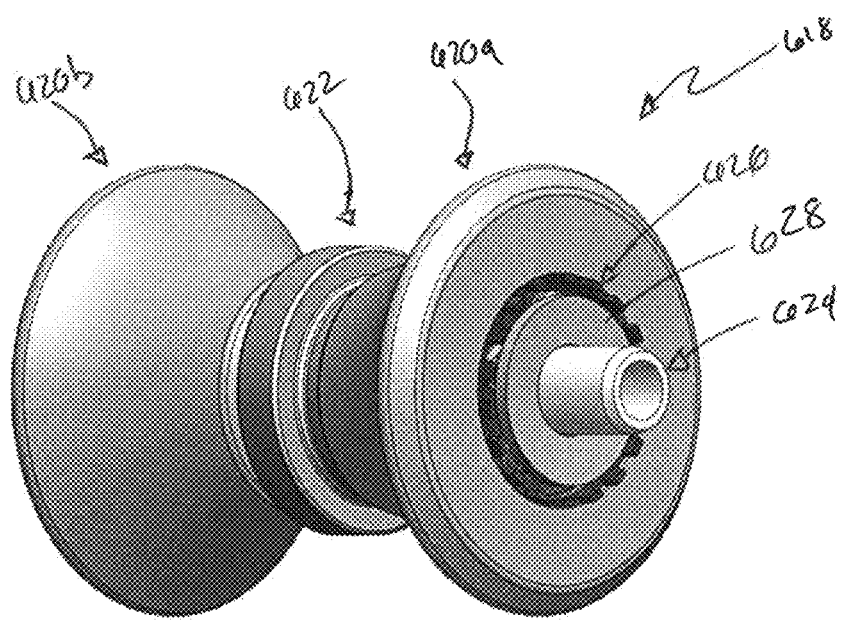
FIG. 41 is a perspective view of the lower support bearing assembly of FIG. 40 illustrated with a biasing element disposed thereon.

The housing 510 includes a through-bore 510a (FIG. 35) defined through opposing side surfaces 510b and 510c thereof. An inner surface of the through-bore 510a includes a ring gear 512 disposed thereon having a plurality of teeth 512a circumferentially disposed thereon using any suitable means, such as friction fit, welding, adhesives, etc. Although generally illustrated as being a separate component from the housing 510, it is contemplated that the ring gear 512 may be integrally formed with the housing 510. Each tooth of the plurality of teeth 512a is disposed at an angle relative to a longitudinal axis defined through the opposed side surfaces 510b, 510c and concentric with the through-bore 510a, although any suitable orientation is contemplated depending upon the design needs of the articulation system 500. Each side surface of the opposing side surfaces 510b, 510c defines a countersink or tapered face 514 therein that extends towards a center portion of the housing 510. As illustrated in FIG. 35, the tapered face 514 of each of the side surfaces 510b defines a corresponding ridge or shelf 514a at a portion of the outer circumference thereof to provide rotational support to a portion of the gearbox 520, as will be described in further detail hereinbleow.

The gearbox 520 includes a gear housing 522, a worm gear 526, and a motor 528. The gear housing 522 includes a flange assembly 524 having a first flange 524a and a second flange 524b that is selectively couplable therewith. The first flange 524a includes a generally cylindrical profile having a planar first side surface 524c and an opposite, planar side surface 524d, each of the first and second side surfaces 524c, 524d defining a bore 524e therethrough. Although generally illustrated as having a square profile, it is contemplated that the bore 524e may include any suitable profile that corresponds to the profile of the torque tube 530 such that that the drive tube is translatably supported therein and is inhibited from rotating therein. An inner surface 524f of the bore 524e defines a cavity 524g therein that is configured to rotatably support the worm gear 526 such that the worm gear is maintained in mechanical communication with the plurality of teeth 512a of the ring gear 512 and a portion of the torque tube 530, as will be described in further detail hereinbelow.

The first side surface 524c of the first flange 524a includes a motor housing 524h disposed thereon and extending diagonally therefrom (e.g., both longitudinally and radially therefrom) and terminating at a face 524i. The face 524i defines a lumen 524j therein that is in open communication with the cavity 524g. The motor 528 is selectively coupled to the motor housing 524h such that the motor 528 and flange assembly 524 is caused to be rotated in unison, as will be described in further detail herein below.

The second side surface 524d defines a boss 524k thereon and extending therefrom. Although generally illustrated as having a cylindrical profile, it is contemplated that the boss 524k may include any suitable profile, such as square, oval, rectangular, octagonal, etc. The intersection of the second side surface 524d and an outer surface 524L of the first flange 524a defines a chamfer 524m that is complimentary to the tapered face 514 of the side surface 510b of the housing 510. In an assembled state, the first flange 524a includes an outer dimension corresponding to an outer dimension of the housing 510. In this manner, the outer surface 524L of the first flange 524a is rotatably supported by the ridge 514a of the housing 510.

The second flange 524b defines generally frusto-conical profile having a tapered outer surface 524n extending between opposed side surfaces 524o and 524p, respectively. The tapered outer surface 524n includes a profile that is complimentary to that of the tapered face 514 of the side surface 510c of the housing 510. The opposed side surfaces 524o, 524p define an aperture (not shown) therethrough that is configured to receive a portion of the boss 524k therein.

When in an assembled state, the flange assembly 524 is rotatably supported and translatably fixed within the through-bore 510a of the housing 510. In this manner, the boss 524k of the first flange 524a is advanced within the through-bore 510a of the housing 510 until the chamfer 524m of the first flange 524a abuts the tapered face 514 of the side surface 510b of the housing 510. Next, the second flange 524b is advanced over the boss 524k of the first flange 524a such that a portion of the boss 524k is received within the aperture of the second flange 524b. The second flange 524b is further advanced over the boss 524k until the tapered outer surface 524n abuts the tapered face 514 of the side surface 510c of the housing 510. A fastener or other suitable means is utilized to draw the second flange 524b towards the first flange 524a such that the chamfer 524m and the tapered outer surface 524n of the first and second flanges, respectively, compress against the respective tapered faces 514 of the housing 510 to rotatably support the flange assembly 514 within the through-bore 510a of the housing 510. In this manner, compression of the chamfer 524m and the tapered outer surface 524n against the respective tapered faces 514 inhibits the flange assembly 514 from translating within the through-bore 510a and maintains co-axial alignment of the flange assembly 514 and the through-bore 510a.

The worm gear 526 is disposed within the cavity 524g of the first flange 524a and is rotatably supported and translatably fixed therein using any suitable means, such as pins, fasteners, etc. A portion of the worm gear 526 is selectively coupled to an output shaft (not shown) of the motor 528 such that rotation of output shaft causes a corresponding rotation of the worm gear 526. The worm gear 526 includes an outer dimension that enables a portion of the worm gear 526 to extend within the bore 524e of the first flange 524a (e.g., past the inner surface 524f of the bore 524e) and extend past an outer surface of the counterbore 524k such that in an assembled state, the worm gear 526 is in mechanical communication with the plurality of teeth 512a of the ring gear 512 and a portion of the torque tube 530, as will be described in further detail hereinbelow. In this manner, rotation of the worm gear 526 causes a corresponding rotation of the flange assembly 524 within the through-bore 510a of the housing 510.

The torque tube 530 defines a generally rectangular profile that is complimentary to that of the bore 524e of the first flange 524, although it is contemplated that the torque tube 530 may define any suitable profile. A side surface 530a of the torque tube 530 includes a plurality of teeth 532 defined therein at a diagonal angle with respect to a longitudinal axis E-E extending through the torque tube 530. As can be appreciated, the plurality of teeth 532 of the torque tube 530 is configured to engage teeth of the worm gear 526, such that rotation of the worm gear 526 causes axial translation of the torque tube 530 within the bore 524e of the first flange 524.

In operation, rotation of the output shaft (not shown) of the motor 528 causes a corresponding rotation of the worm gear 526. As the worm gear 526 is caused to be rotated, the teeth of the worm gear 526 simultaneously abut respective teeth of the plurality of teeth 512a of the ring gear 512 and respective teeth of the plurality of teeth 532 of the torque tube 530. Continued rotation of the worm gear 526 causes simultaneous rotation of the gearbox 520, along with the torque tube 530, and axial translation of the torque tube 530 within the gearbox 520. In this manner, rotation of the torque tube 530 causes a corresponding rotation of the solar array 20 to follow the position of the sun. As can be appreciated, the simultaneous rotation and translation of the drive tube provides self-locking or anti-backdrive properties sufficient to inhibit the torque tube 530 from rotating under the static weight of the solar array 20 and the support beams 30 (e.g., the static weight of the solar array 20 and the support beams 30 applies a torque to the torque tube 530, which in turn, applies a torque to the worm screw 526 and thus, the motor 528. Additionally, the anti-backdrive properties of the articulation system 500 inhibits the torque tube 530 from rotating when an external force is applied to the solar tracking system 10, such as wind, snow, wildlife, etc.

FIGS. 38-42 illustrate another embodiment of an articulation system provided in accordance with the present disclosure generally identified by reference numeral 600. The articulation system 600 includes a drive tube assembly 602 and a drive tube support 610. As can be appreciated, the articulation system 600 may be supported n the plurality of bases 50 described in detail hereinabove using any suitable means.

The drive tube assembly 602 includes a drive tube 604 and a pair of end caps 606. The drive tube assembly 602 is substantially similar to the helical tube assembly 310, and therefore only the differences therebetween will be described in detail herein in the interest of brevity. The drive tube 604 defines a generally cylindrical configuration having an outer surface 604a extending between opposed end surfaces 604b and 604c and defining a longitudinal axis F-F therethrough. The outer surface 604a of the drive tube 604 defines a helical channel 604d therein extending between the opposed end surfaces 604b, 604c and follows a helical arc wound about the longitudinal axis F-F such that the drive tube 604 defines a cylindrical cam or barrel cam configuration. As can be appreciated, the amount of rotation and the pitch of the channel 604d may vary depending upon the installation needs of the solar tracking system 10.

The drive tube support 610 includes an upper portion 612, a lower portion 614, a plurality of roller bearings 616, and a lower support bearing assembly 618. The upper portion 612 defines a generally U-shaped profile, although any suitable profile is contemplated. The upper portion 612 extends between a first end portion 612a and a second, opposite end portion (not shown), each of which is configured to selectively engage a respective portion of the lower portion 614, as will be described in further detail hereinbelow. In this manner, the upper portion 612 defines a channel 612c that is configured to receive a portion of the drive tube assembly 602 therein.

The plurality of roller bearings 616 is disposed on the upper portion 612 and is configured to rotatably and slidably retain the drive tube assembly 602 within the channel 612c. In this manner, each roller bearing of the plurality of roller bearings 616 abuts a portion of the outer surface 604a of the drive tube 604 to maintain an axial position of the drive tube assembly 602 within the channel 612c of the upper portion 612. It is contemplated that the plurality of roller bearings 616 may be disposed on the upper portion 612 using any suitable means.

The lower portion 614 of the drive tube support 610 defines a generally U-shaped profile having a pair of out-turned flanges 614a. Each flange of the pair of out-turned flanges 614a is configured to be selectively or fixedly coupled to the first end portion 612a and the second end portion (not shown) of the upper portion 612 such that the channel 612c of the upper portion 612 is fully enclosed. As can be appreciated, it is envisioned that the pair of out-turned flanges 614a may be coupled to the first and second opposed end portions 612a, (not shown) using any suitable means, such as mechanical fasteners, adhesives, welding, etc. The lower portion 614 of the drive tube support 610 is selectively or fixedly coupled to the second end portion 50b of a respective base of the plurality of bases 50 using any suitable means, such as flanges, base-plates, mechanical fasteners, fiction fit, adhesives, welding, etc.

The U-shaped profile of the lower portion 614 of the drive tube support 610 includes opposed side surfaces 614b, each of which defining a plurality of slots 614d therein arranged in a circumferential pattern. Each side surface of the opposed side surfaces 614b defines a bore (not shown) disposed within a perimeter of the plurality of slots 614d that is configured to receive a portion of the lower support bearing assembly 618 therein, as will be described in further detail hereinbelow.

The lower support bearing assembly 618 includes a pair of outer rollers 620a and 620b, an inner roller 622 interposed between the pair of outer rollers 620a, 620b, a support shaft 624, and a pair of dog rings 626 selectively coupled to a corresponding roller of the pair of outer rollers 620a, 620b. Each roller of the pair of outer rollers 620a, 620b is substantially similar, and therefore, only one outer roller 620a will be described in detail hereinbelow. The outer roller 620a defines a generally one-half hourglass profile (e.g., an hourglass profile split in half in a longitudinal direction) extending between a first end surface 620c and a second, opposite end surface 620d, each of the first and second end surfaces 620c, 620d defining an aperture (not shown) therethrough. The first end surface 620c defines a counterbore 620e therein that is disposed concentric with the aperture and is configured to receive a portion of a corresponding dog ring of the pair of dog rings 626 therein.

The inner roller 622 defines a generally cylindrical profile extending between opposed end surfaces 622a and 622b. Each of the end surfaces 622a, 622b defines a bore (not shown) therethrough that is configured to receive a portion of the support shaft 624 therein. An outer surface 622d of the inner roller 622 defines a flange 622e thereon and extending radially outward therefrom. The flange 622e is configured to be received within the helical channel 604d of the drive tube 604. In this manner, as the drive tube 604 is translated in an axial direction along the axis F-F, the flange 622e of the inner roller 622 acts upon the helical channel 604d of the drive tube 604 and causes the drive tube 604 to rotate, which in turn, causes the solar array 20 to rotate.

Each dog ring of the pair of dog rings 626 is substantially similar and therefore, only one dog ring 626 will be described in detail herein in the interest of brevity. The dog ring 626 defines a generally cylindrical profile having a counterbore 626a defined within a first end surface 626b. An outer surface 626c of the dog ring defines a plurality of channels 626d therethrough arranged in a circumferential manner adjacent the first end surface 626b to form a corresponding plurality of dogs or tabs 626e. As can be appreciated, the spacing between each dog of the plurality of dogs 626e and the dimensions of each dog of the plurality of dogs 626e is such that each dog of the plurality of dogs 626e can be selectively received within a corresponding slot of the plurality of slots 614d of the lower support 614. The dog ring 626 includes an outer dimension that enables the dog ring 626 to be received within the counterbore 620e of the outer roller 620a and include a thickness such that the plurality of dogs 626e extends past the first end surface 620c of the outer roller 620a.

Each of the pair of outer rollers 620a, 620b, the inner roller 622, and the pair of dogs rings 626 is fixedly coupled to one another such that each of the outer rollers 620a, 620b, the inner roller 622, and the pair of dogs rings 626 is inhibited from moving relative to one another. Although generally illustrated as being coupled by means of fasteners, it is contemplated that the outer rollers 620a, 620b, the inner roller 622, and the pair of dog rings 626 may be coupled to one another using any suitable means, such as adhesives, welding, etc. Although generally described herein as being separate components, it is contemplated that one or more of the outer rollers 620a, 620b, the inner roller 622, and the pair of dogs rings 626 may be integrally formed (e.g., one piece construction).

A pair of biasing elements 628 is disposed adjacent each respective dog ring of the pair of dog rings 626. Each biasing element of the pair of biasing elements 628 is substantially similar, and therefore, only one biasing element 628 will be described herein in the interest of brevity. Although generally illustrated as being a Bellville washer, it is contemplated that the biasing element may be a compression spring, elastomeric spring, hydraulic spring, or may be a plurality of Bellville washers, etc. The biasing element 628 abuts a portion of the dog ring 626 and a portion of a respective side surfaces 614b of the lower portion 614 of the drive tube support 610 and biases the lower support bearing assembly 618 away from each respective side surface 614b (e.g., provides a centering effect). As can be appreciated, each biasing element of the pair of biasing elements includes a biasing force that is greater than the lateral force generated by the camming action of the flange 622e against the helical channel 604d during normal operation (e.g., during intentional rotation of the solar array 20). In this manner, the biasing element is only compressed when a biasing force greater than that created during normal operation is generated (e.g., wind loading, snow, animals, etc.).

Figure 42:
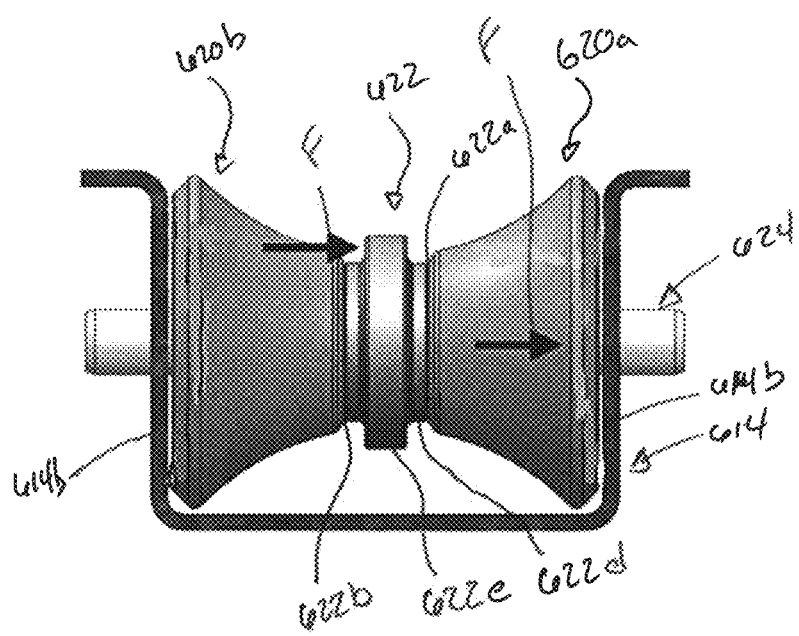
FIG. 42 is a front view of the lower support bearing assembly disposed within a lower portion of a drive tube support of the articulation system of FIG. 38.

In operation, as the drive tube assembly 602 is driven in an axial direction along the longitudinal axis F-F, the flange 622e of the inner roller 622 acts against a portion of the helical channel 604d of the drive tube 604 and causes the drive tube assembly 602 to rotate about the longitudinal axis F-F. When an external force is applied to the solar array 20 (e.g., wind loading, debris, animals, etc.), a corresponding torque is generated about the drive tube assembly 602, which in turn, applies a force on the flange 622e of the inner roller 622 such that the drive tube assembly 602 is caused to be rotated (e.g., backdriven). With reference to FIG. 42, the torque applied to the drive tube assembly 602 causes the helical channel 604d to apply a lateral force to the flange 622e of the inner roller in a direction indicated by the arrow labeled "F." The force in the direction of the arrow "F" causes the respective biasing element 628 of the pair of biasing elements to compress and cause the lower support bearing assembly 618 to translate in the direction of the arrow "F" and enable the plurality of dogs 626e of the respective dog ring 626 to be received within a corresponding plurality of plurality of slots 614d of the lower support 614 to lock the drive tube assembly 604 in place and inhibit further rotation thereof. In this manner, the plurality of dogs 626e and the plurality of slots 614d cooperate to provide an anti-backdrive property to the articulation system 600. When the external load is removed, the biasing element 628 biases the lower support bearing assembly 618 away from the side surface 614b of the lower support 614 and disengages the plurality of dogs 626e from the plurality of slots 614d to permit rotation of the drive tube assembly 604.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A solar tracking system, comprising:
a solar array;
a plurality of support beams configured to support the solar array;
a torque tube coupled to the plurality of support beams;
a base configured to rotatably support the torque tube; and
an articulation system configured to rotate the torque tube relative to the base, the articulation system comprising:
a first helical tube coupled to the torque tube;
a first helical tube support disposed on the base and configured to slidably support the first helical tube; and
a gearbox in mechanical communication with the first helical tube,
wherein actuation of the gearbox causes the first helical tube and the torque tube attached thereto to translate along their longitudinal axes within the first helical tube support, and the first helical tube support is configured to rotate the first helical tube and the torque tube attached thereto as the first helical tube and the torque tube attached thereto are translated along their longitudinal axes therein to cause a corresponding rotation of the solar array.

2. The solar tracking system according to claim 1, wherein the first helical tube defines a helical portion that follows a helical arc wound about a longitudinal axis defined by the first helical tube.

3. The solar tracking system according to claim 2, wherein the first helical tube support includes a plurality of rollers rotatably supported thereon, the plurality of rollers configured to abut an outer surface of the helical portion of the first helical tube.

4. The solar tracking system according to claim 3, wherein the articulation system includes a second helical tube coupled to the torque tube and a second helical tube support disposed on the base and configured to slidably support the second helical tube.

5. The solar tracking system according to claim 4, wherein the second helical tube defines a helical portion that follows a helical arc wound about a longitudinal axis defined by the second helical tube.

6. The solar tracking system according to claim 5, wherein the second helical tube support includes a plurality of rollers rotatably supported thereon, the plurality of rollers configured to abut an outer surface of the helical portion of the second helical tube.

7. The solar tracking system according to claim 6, wherein the articulation system includes a power screw having a threaded outer surface extending between a first end portion and a second, opposite end portion, the power screw rotatably coupled to the gearbox, wherein the first end portion of the power screw is threadably coupled to the first helical tube and the second end portion of the power screw is threadably coupled to the second helical tube.

8. The solar tracking system according to claim 7, wherein the power screw defines a first threaded outer surface adjacent the first end portion and a second threaded outer surface adjacent the second end portion, wherein the first threaded end portion is threaded in an opposite direction to the second threaded end portion, such that as the power screw is rotated in a first direction, the power screw draws the first and second helical portions toward one another and as the power screw is rotated in a second direction, the power screw pushes the first and second helical portions away from one another.

9. The solar tracking system according to claim 8, wherein the helical portion of the first and second helical tubes is configured to rotate the first and second helical tubes approximately 100 degrees over a length of approximately 35 inches.

10. The solar tracking system according to claim 6, wherein the plurality of rollers of the first and second helical tube supports defines an hourglass profile.

11. The solar tracking system according to claim 6, wherein the plurality of rollers of the first and second helical tube supports defines a cylindrical profile.

12. A solar tracking system, comprising:
a solar array;
a plurality of support beams configured to support the solar array;
a torque tube coupled to the plurality of support beams;
a base configured to rotatably support the torque tube; and an articulation system configured to rotate the torque tube relative to the base, the articulation system comprising:
a helical tube coupled to the torque tube; and
a gearbox disposed on the base and configured to rotatably support the helical tube, the gearbox in mechanical communication with the helical tube,
wherein actuation of the gearbox causes the helical tube to translate within the gearbox, and the gearbox is configured to rotate the helical tube and the torque tube attached thereto as the helical tube and the torque tube attached thereto are translated along their longitudinal axes to cause a corresponding rotation of the solar array.

13. The solar tracking system according to claim 12, wherein the gearbox includes a worm gear rotatably supported therein, the worm gear in mechanical communication with the ring gear and the torque tube.

14. The solar tracking system according to claim 13, wherein a portion of the torque tube defines a plurality of threads thereon that is configured to engage the worm gear.

15. The solar tracking system according to claim 13, wherein the gearbox includes a flange assembly having a first flange and a second, opposite flange that is selectively couplable therewith.

16. The solar tracking system according to claim 14, wherein each of the first and second flanges of the flange assembly defines a respective chamfer thereon that is configured to abut a corresponding tapered surface defined on the housing, wherein the chamfers of the first and second flanges and the respective tapered surfaces cooperate to rotatably support the flange assembly within the housing.

17. The solar tracking system according to claim 12, wherein the teeth of the ring gear are disposed at an angle relative to a longitudinal axis defined through the through-bore of the housing.

18. The solar tracking system according to claim 17, wherein the worm gear is disposed at an angle relative to the longitudinal axis defined through the through-bore of the housing.

19. The solar tracking system according to claim 18, wherein the plurality of teeth of the torque tube is disposed at an angle relative to a longitudinal axis defined through the torque tube.

20. The solar tracking system according to claim 12, wherein the torque tube is selectively couplable to a drive tube that is disposed within the gearbox, the drive tube defining a plurality of teeth thereon configured to engage the worm gear.

* * * * *